United States Patent
Ota et al.

(10) Patent No.: US 7,362,359 B2
(45) Date of Patent: Apr. 22, 2008

(54) ELECTRONIC DEVICE WITH AN IMAGING FUNCTION, IMAGE DATA OUTPUT SYSTEM, AND IMAGE DATA OUTPUT METHOD

(75) Inventors: Motoari Ota, Saitama-ken (JP); Tsuneo Sato, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 696 days.

(21) Appl. No.: 10/367,679

(22) Filed: Feb. 19, 2003

(65) Prior Publication Data

US 2004/0061792 A1    Apr. 1, 2004

(30) Foreign Application Priority Data

Feb. 18, 2002 (JP) .............................. 2002-040045
Sep. 30, 2002 (JP) .............................. 2002-285969

(51) Int. Cl.
*H04N 5/76* (2006.01)
*H04N 5/232* (2006.01)

(52) U.S. Cl. .............................. 348/231.2; 348/231.99; 348/231.3; 348/211.99

(58) Field of Classification Search ........... 348/231.99, 348/231.2, 231.3, 211.99, 211.2, 211.3
See application file for complete search history.

(56) References Cited

U.S. PATENT DOCUMENTS

| | | | |
|---|---|---|---|
| 5,633,678 A * | 5/1997 | Parulski et al. ........... 348/231.5 |
| 6,433,818 B1 * | 8/2002 | Steinberg et al. ........... 348/161 |
| 6,567,122 B1 * | 5/2003 | Anderson et al. ......... 348/211.3 |
| 6,701,058 B1 * | 3/2004 | Tsubaki ....................... 386/46 |
| 2001/0045985 A1 * | 11/2001 | Edwards et al. ............ 348/231 |
| 2002/0036698 A1 * | 3/2002 | Mizutani ..................... 348/232 |
| 2002/0051065 A1 * | 5/2002 | Takahashi .................... 348/232 |
| 2002/0060740 A1 * | 5/2002 | Kato .......................... 348/232 |
| 2002/0093582 A1 * | 7/2002 | Aoki et al. ............ 348/333.02 |
| 2002/0191079 A1 * | 12/2002 | Kobasyashi et al. ...... 348/207.1 |

FOREIGN PATENT DOCUMENTS

JP    2000-217006 A    8/2000

* cited by examiner

*Primary Examiner*—Lin Ye
*Assistant Examiner*—Kelly Jerabek
(74) *Attorney, Agent, or Firm*—Birch, Stewart, Kolasch & Birch, LLP

(57) ABSTRACT

A mobile telephone is connected to a camera, and their respective power supplies are turned on. A telephone number of the local station is read out and recorded in a flash ROM as registration number data. Moreover, the registration number data is input with image data. As the registration number data is the telephone number of the local station input from the mobile telephone, the image data may be secured without the complex encryption processing of conventional examples. That is, a sense of security may be obtained because forgetting the specific registration number is unlikely when the telephone number of the local station input from the mobile telephone is used as the specific registration number data. Accordingly, the collation procedure becomes easier when the image data is obtained or an order for photo prints is made, and access to the image data may be easily restricted since the image data can be secured without complex encryption processing.

20 Claims, 15 Drawing Sheets

ELECTRONIC DEVICE WITH AN IMAGING FUNCTION, IMAGE DATA OUTPUT SYSTEM, AND IMAGE DATA OUTPUT METHOD

BACKGROUND OF THE INVENTION

1. Field of the Invention

The present invention relates to an electronic device such as a digital still camera with an imaging function, an image data output system and an image data output method, wherein the invention records identification data input from an external terminal, said input data corresponding to certain formed image data.

2. Description of the Related Art

Certain conventional digital photography processing devices have been equipped with an encryption processing unit, which encrypts the image data itself in order to hide the images from unauthorized viewers. The technology disclosed in Japanese Patent Application Laid-Open (JP-A) No. 2000-217006 uses such encryption processing.

However, encryption of the image data in conventional encryption processing is complex, and a password is required when the user tries to obtain extra prints. That is, decipherment using a password has been required in order to decrypt the encrypted image data and thus, the conventional technology is problematic in that the procedure becomes too complex. Hence, there is a need for technology that allows user-friendly control of recorded image data.

SUMMARY OF THE INVENTION

The present invention has been made in consideration of the above circumstances, and the object is to obtain an electronic device with an imaging function, an image data output system, and an image data output method, all of which easily restrict access to certain recorded image data.

In order to achieve the above objective, according to a first aspect of the invention, an electronic device with an imaging function is provided, comprising: an imaging unit, which forms images of objects; an input section, which inputs specific registration identification data from external terminals; and a recording unit, which records the specific registration identification data input from the input section, said specific registration data corresponding to image data obtained by forming images with the imaging unit.

The specific registration identification data, such as the telephone numbers of mobile telephones (personal numbers), are input from external terminals such as mobile telephones to the input section. Then, specific registration identification data are recorded in the recording unit, corresponding to image data obtained by forming images with the imaging unit. As the specific registration identification data are input corresponding to the image data in the electronic device according to the first aspect of the invention, the security of the image data recorded in the recording unit is maintained.

In other words, in the first aspect of the present invention relating to the electronic device, the collation procedure becomes easier when the image data are obtained or orders for photo prints are made, and access to the image data may be easily restricted, since the image data can be secured without the complex encryption processing of conventional examples. Moreover, printing service of the image data and the like may be received by notification of the specific registration identification data.

In addition, the electronic device according to the first aspect of the invention is suitably used as a single-use type digital camera, which is rented to and recovered from users, when a recording unit such as a flash ROM is built non-detachably into the main body of the device. Here, the recording unit has been configured to be non-detachable from the main body of the device in order to prevent the specific registration identification data, the image data, and the like from being "leaked" (outputted) to other computers.

The electronic device according to the first aspect of the invention may be configured so that the above external terminal is a mobile telephone, and the above specific registration identification data are the mobile telephone number data input from the above input section. Hence, the user can feel a sense of security because it is highly unlikely that they will forget their own specific registration number, i.e. the user's own telephone number, which is input from their mobile telephone.

The electronic device according to the first aspect of the invention may be configured so that telephone number data recorded in the above recording unit are updated to the latest telephone number data when the above telephone number data, which have been input from the input section, differ from the above telephone number data recorded in the above recording unit.

A user who has a mobile telephone corresponding to each formed image data is specified by identifying the identification number data, as the specific registration number data recorded in the recording unit is changed to the latest telephone number data when the telephone number data, which is the specific registration identification data, at input is different from the telephone number data recorded in the recording unit.

According to a second aspect of the invention, an image data output system is provided, comprising: an input unit, which inputs specific collation identification data; a collation unit, which collates the above specific collation identification data input through the above input unit with specific registration identification data recorded corresponding to image data recorded in a recording unit; and an authorization unit, which authorizes access to the above image data recorded in the above recording unit only when the above collation unit finds that the above specific registration identification data and the above specific collation identification data are in agreement with each other.

In the image data output system according to the second aspect of the invention, the specific collation identification data input through the input unit are collated with the specific registration identification data recorded corresponding to the image data recorded in the recording unit. Then, access to the above image data recorded in the above recording unit is authorized by the authorization unit only when the collation unit finds that the above specific registration identification data and the above specific collation identification data are in agreement with each other.

According to the image data output system of the second aspect of the invention, the image data can be secured without the complex encryption processing of conventional examples. This is due to the fact that the authorization unit authorizes access to image data recorded in the recording unit only when it finds that the above specific registration identification data and the above specific collation identification data are in agreement with each other.

The image data output system according to the second aspect of the invention may be configured so that the above collation number data input from the above input unit are the collation identification data using telephone number data of the mobile telephones from which messages have been received at a specified contact address, such as a photo-finishing store.

In this case, the input of the specific collation identification data is configured to be based on whether or not the messages have been received at the specified contact address of the mobile telephone (e.g. a telephone device having a specified dialing code of a photo-finishing store), and the collation number data are configured to be telephone number data of the mobile telephones from which the messages have been received at the specified contact address. Accordingly, access processing to the image data becomes easier in comparison with the complex decryption processing in conventional examples, and the security of the image data can be maintained.

The image data output system according to the second aspect of the invention may be configured so that only the above image data for which the above specific registration identification data and the above specific collation number data are in agreement with each other are accessible, when there are a plurality of kinds of the above specific collation identification data recorded that correspond to the image data recorded in the above recording unit.

Further, since only image data for which the specific registration identification data and the specific collation identification data are in agreement with each other are accessible when there are a plurality of kinds of specific collation identification data, the image data can be secured smoothly and reliably.

According to a third aspect of the invention, an image data output method is provided, wherein the specific registration identification data are read out from a recording medium, in which image data and specific registration identification data corresponding to the image data have been recorded, and specific collation identification data are input through an input unit, and the image data recorded in the above recording medium are configured to be output only when the specific collation identification data input through the above input unit and the above specific registration identification data read from the above recording medium are in agreement with each other.

In the image data output method according to the third aspect of the invention, the specific registration identification data are read out from the recording medium, and the specific collation identification data are input by the input unit. The image data are output from the recording medium only when the specific collation identification data are in agreement with the specific registration identification data. According to the image data output method in the third aspect of the invention, the security of the image data can be maintained without the complex encryption processing of conventional examples.

The image data output method according to the third aspect of the invention may be configured so that the above specific collation identification data input from the above input unit are the collation identification data using telephone number data of the mobile telephones from which messages have been received at a specified contact address.

In such cases, the input of the specific collation identification data is configured to be based on whether or not the messages have been received at the specified contact address of the mobile telephones (e.g. a telephone device having a specified dialing code of a photo-finishing store), and the specific collation identification data are configured to be telephone number data of the mobile telephones from which the messages have been received at the specified contact address. Accordingly, access processing to the image data becomes easier in comparison with the complex decryption processing in conventional examples, and the security of the image data can be maintained.

Further, the image data output method according to the third aspect of the invention may be configured so that only the above image data for which the above specific registration identification data and the above specific collation identification data are in agreement with each other are accessible, when there are a plurality of kinds of the above specific collation identification data recorded corresponding to the image data recorded in the above recording unit.

Hence, the security of each piece of image data can be secured in a smooth and reliable manner, as only the image data for which the specific registration identification data and the specific collation identification data are in agreement with each other are accessible when there are a plurality of kinds of specific collation identification data.

Smart Media®, CompactFlash®, an ATA (AT Attachment) card, a floppy disk, or a CD-R (Compact Disc-Recordable) and a CD-RW (Compact Disc-Rewritable) are examples of recording media usable according to the invention.

Moreover, a storage element such as a Flash EEPROM may be used as the recording unit according to the invention. Furthermore, usable electronic devices according to the invention include devices such as digital cameras, digital video cameras, as well as mobile telephones, personal computers, PDAs (Personal Digital Assistant), and the like, which are all provided with an imaging function.

DESCRIPTION OF THE PREFERRED EMBODIMENTS

Hereinafter, a digital camera according to an embodiment of the present invention will be explained, referring to FIGS. 1 through 11.

Figure 1:
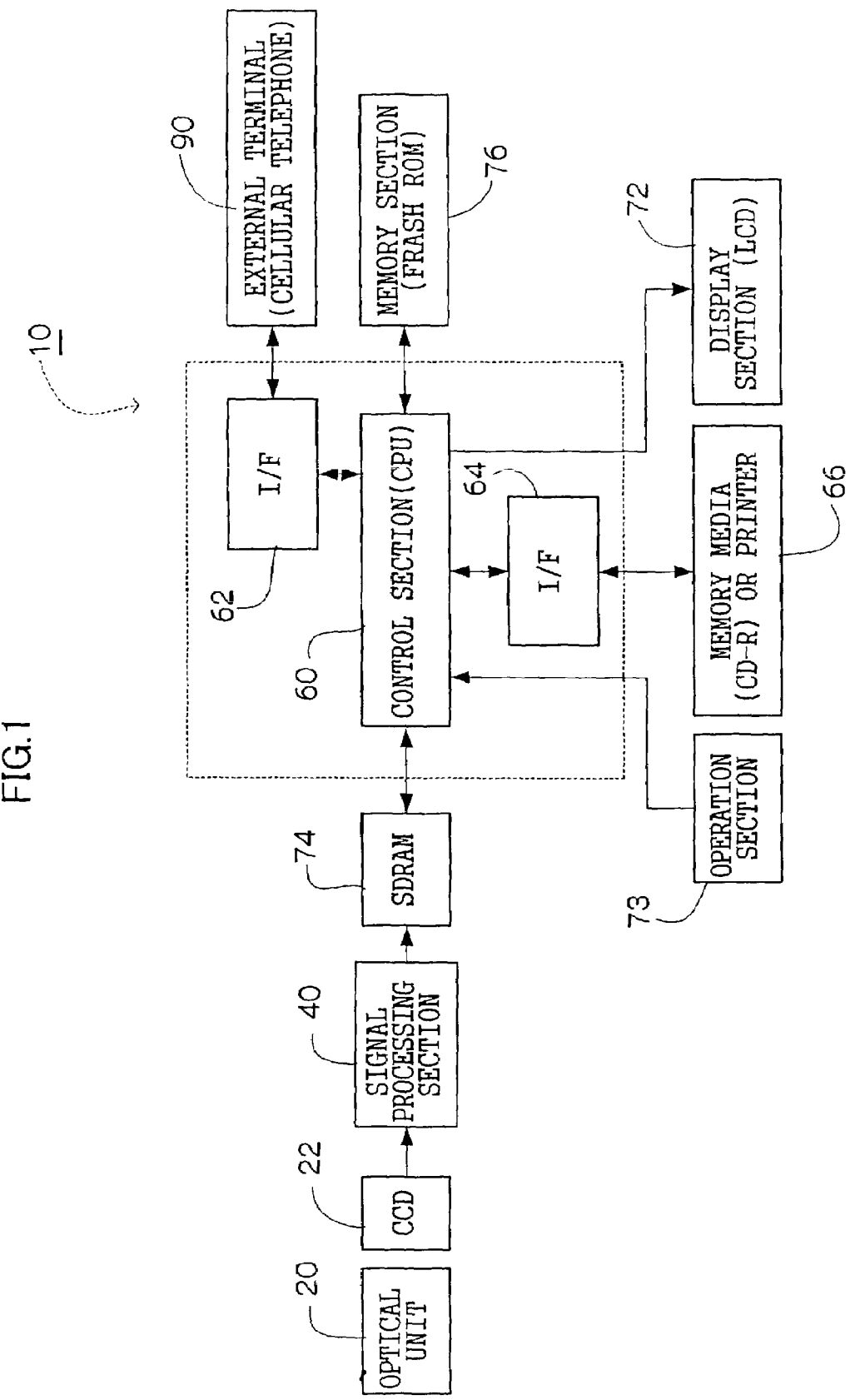
FIG. 1 is a block diagram showing a configuration of a digital camera according to an embodiment of the present invention.

As shown in FIG. 1, the digital camera 10 according to the embodiment comprises: an optical unit 20 including a lens which forms an object image; CCD 22 which is disposed at the back part of an optical axis of the lens as an imaging unit; a signal processing section 40 which generates digital image data showing object images, based on output signals from the CCD 22 and also generates timing signals to drive components of the optical unit 20, the CCD 22, and the like; an SDRAM (Synchronous Dynamic RAM) 74 which stores digital image data obtained by forming images mainly with the CCD 22; and a control section (CPU) 60 which controls overall operations of the digital camera 10.

The CPU 60 which functions as an image processing unit, a collation unit, and an authorization unit has a configuration in which a not-shown imaging control section, which has a predetermined amount of line buffers built-in, and a not-shown compression/expansion section, in which compression processing of digital image data according to a predetermined compression method (a JPEG (Joint Photographic Experts Group) method) in the embodiment) and expansion processing of the compressed digital image data are executed, are connected to each other through a bus.

The digital camera 10 comprises: a display section (LCD) 72 which displays object images obtained by forming images with CCD 22 and various kinds of information; an operation section 73 provided with various kinds of operation keys such as a power supply switch; a storage section (flash ROM) 76 which stores various kinds of parameters and the like; and interfaces (I/Fs) 62 and 64 such as a USB connector.

The flash ROM 76 is built in the main body of the device not in a detachable manner. Here, the embodiment may have a configuration in which a recording unit such as the flash ROM 76 is a detachable component.

An external connection section is connected between an interface 62, which is an input section, and the CPU 60, and the external connection section controls communication with an external terminal (for example, a mobile telephone 90 in the embodiment) which is connected to the interface 62. Here, the signal processing section 40 comprises: a not-shown correlated double sampling circuit (CDS); a gain controller; an A/D converter; and a timing generator.

After correlated double sampling processing in the correlated double sampling circuit is performed and sensitivity adjustment for R (red), G (green), and B (blue) in the CCD 22 is individually executed in the gain controller, the signals output from the CCD 22 are input to the A/D converter as R, G and B signals for each pixel, respectively.

The A/D converter separately converts each of the R, G, and B signals, which are input one by one from the gain controller, to 12-bit R, G, and B signals (hereinafter referred to as "digital image data") for output to the CPU 60 as an image processing unit. Then, the CPU 60 accumulates the digital image data, which are input from the A/D converter one by one, in the built-in line buffer for temporary storage in the SDRAM 74.

The digital image data stored in the SDRAM 74 are read out by the CPU 60 and 8-bit digital image data are generated after white-balance adjustment by respective multiplication of digital gains according to the kinds of the light sources on the read data and by gamma processing and sharpness processing. Furthermore, brightness signals Y and chroma signals Cr, and Cb (hereinafter referred to as "YC signal") are generated by YC signal processing, and the YC signals are stored in the SDRAM 74 again.

Figure 3:
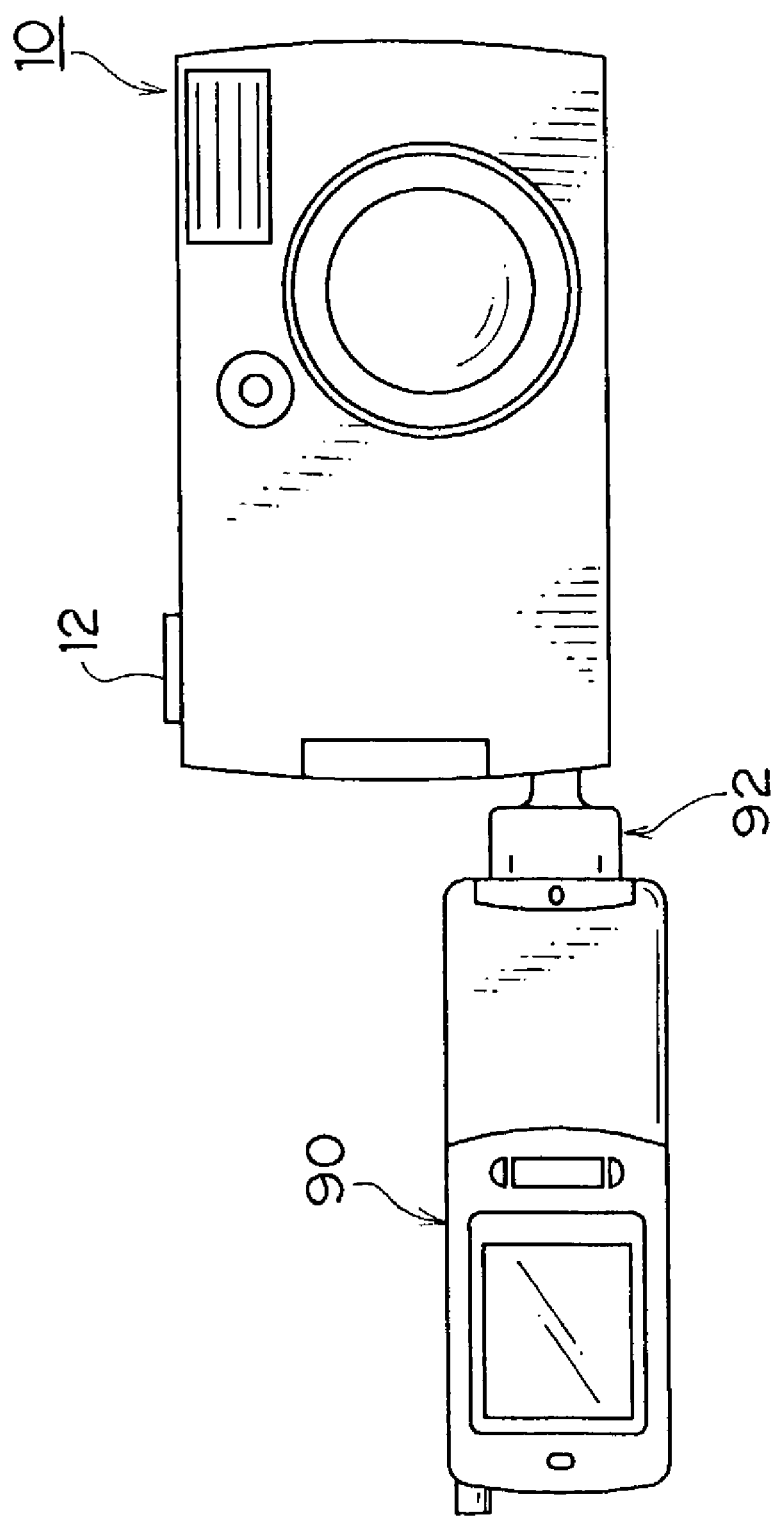
FIG. 3 is a view showing a state in which a mobile telephone is connected to the digital camera.

When a photographer pushes a shutter button 12 shown in FIG. 3, the YC signals stored in the SDRAM 74 are compressed according to a predetermined compression method in the compression/expansion section for storage in the flash ROM 76. That is, a piece of image data of an object is stored in the flash ROM 76.

Also, a portable storage media 66 such as CD-R and CD-RW as a recording unit, or a printer is connected to the interface (I/F) 64, and various kinds of information such as the digital image data which have been stored on the flash ROM 76 are written into a storage media (CD-R) 66, or are output from the printer as a print.

In addition, the digital camera 10 has a configuration in which the digital image data stored in the flash ROM 76 are continuously transmitted to a connected printer as a communication mode in which the printer and the like are connected to the camera 10 through an interface 64.

Specific registration identification data input from the mobile telephone 90 which is an external terminal (or an input unit) are stored in the flash ROM 76 through the interface 62 and the CPU 60. Then, the specific registration identification data stored in the flash ROM 76 are read out by the CPU 60 and are made into association with the image data transferred from the SDRAM 74.

Figure 2:
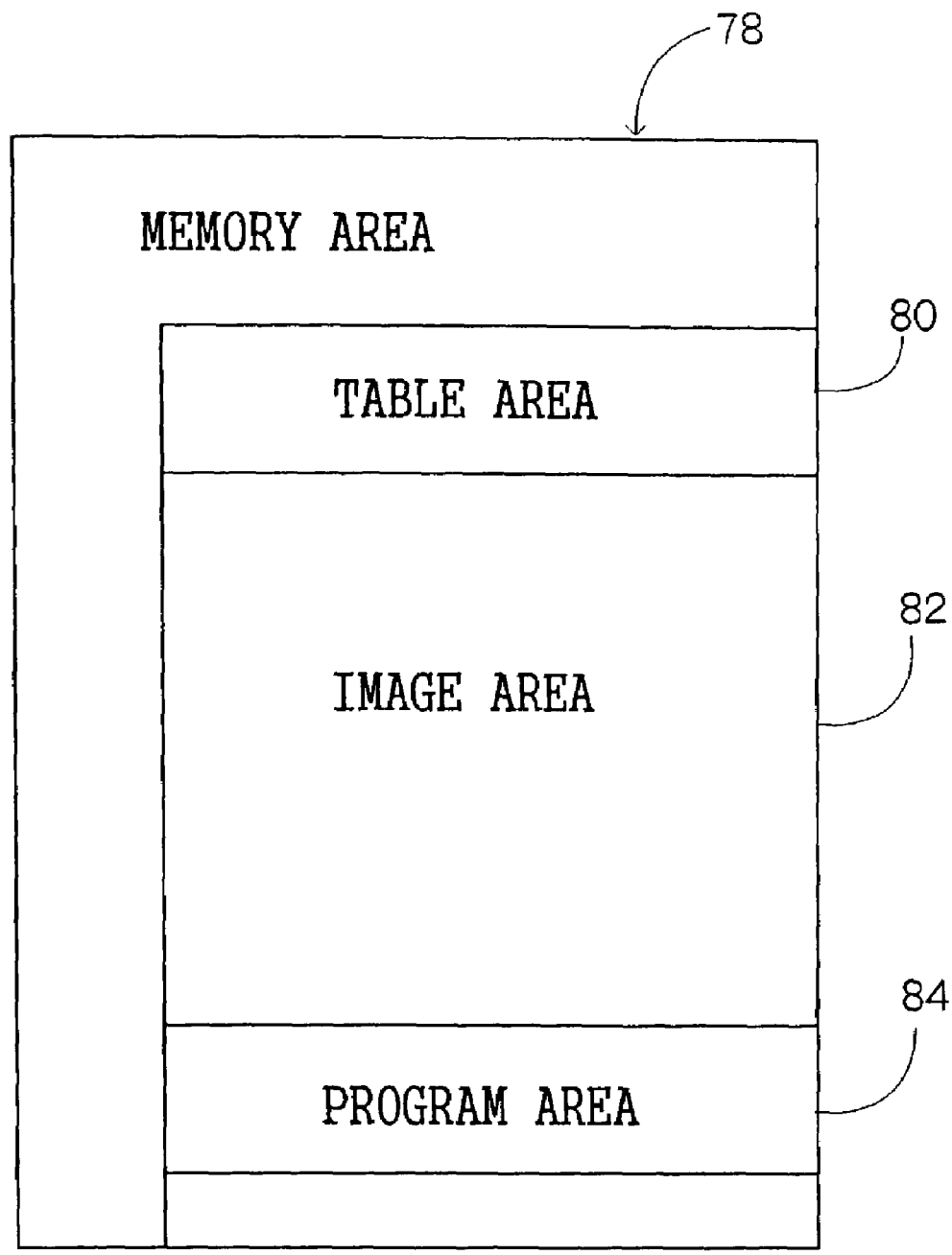
FIG. 2 is a diagram of a memory map in a storage section (flash ROM) shown in FIG. 1.
Figure 5:
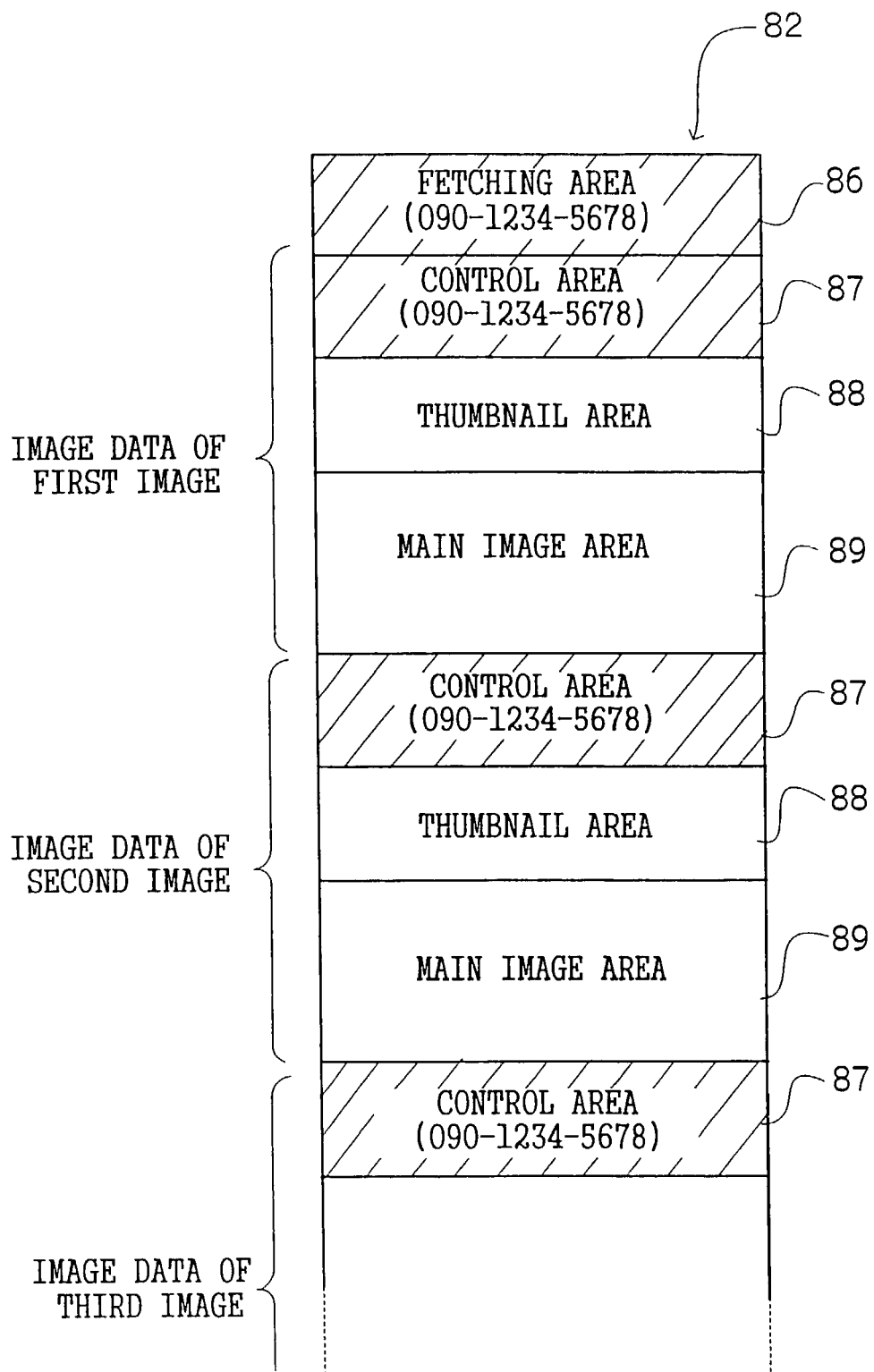
FIG. 5 is a diagram showing a memory map in an image area of the flash ROM shown in FIG. 2.
Figure 6:
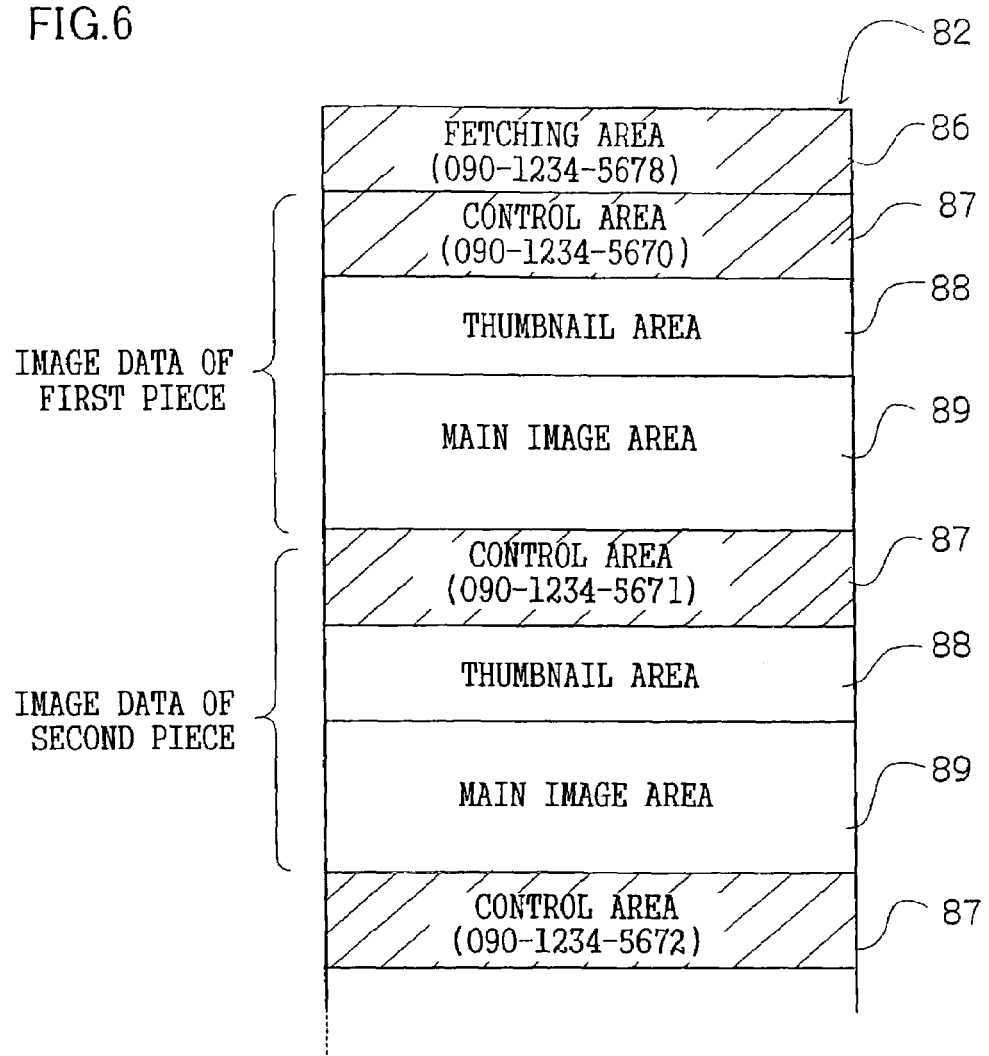
FIG. 6 is a view of another memory map in the image area shown in FIG. 5.
Figure 6:
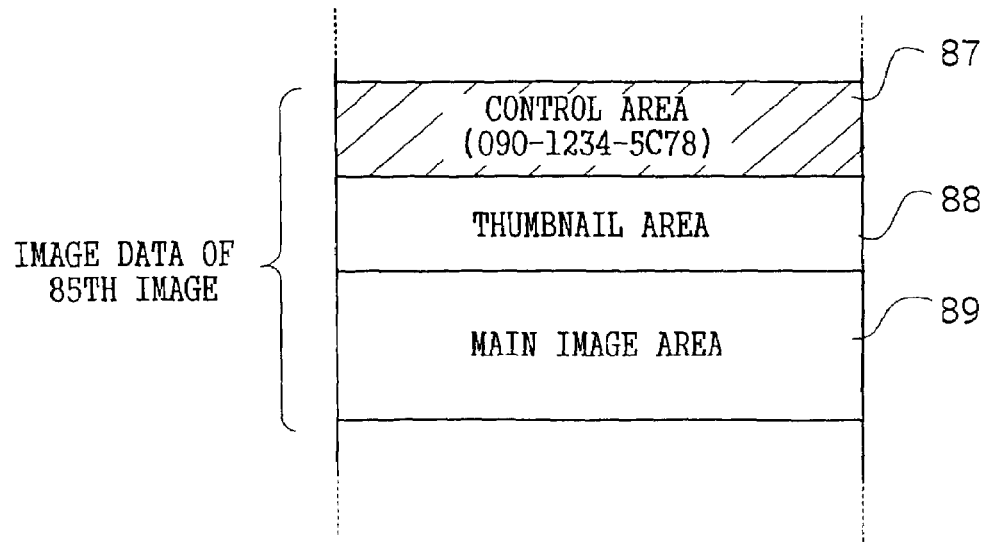

As shown in FIG. 2, a storage area 78 of the flash ROM 76 comprises: a table area 80 in which data included in Table 1, Table 2, and the like are stored beforehand; an image area 82 in which data and the like shown in FIG. 5 or FIG. 6 are stored; a program area 84 in which a program, which automatically converts the specific registration identification data, and the like are stored beforehand; and the like.

Subsequently, processing for registration and collation of security numbers in the digital camera 10 will be explained, referring to FIGS. 3 through 11. Here, the digital camera 10 according to the embodiment is of a so-called single-use type digital camera, and, specifically, the camera 10 is rented to a general user and recovered from the user.

In the first place, a mode setting processing, which is executed by the digital camera 10, will be explained while referring to FIG. 7. Here, a registration mode shown in FIG. 7 is an example in which the registration mode is performed before the first image data is recorded in the flash ROM 76.

Figure 7:
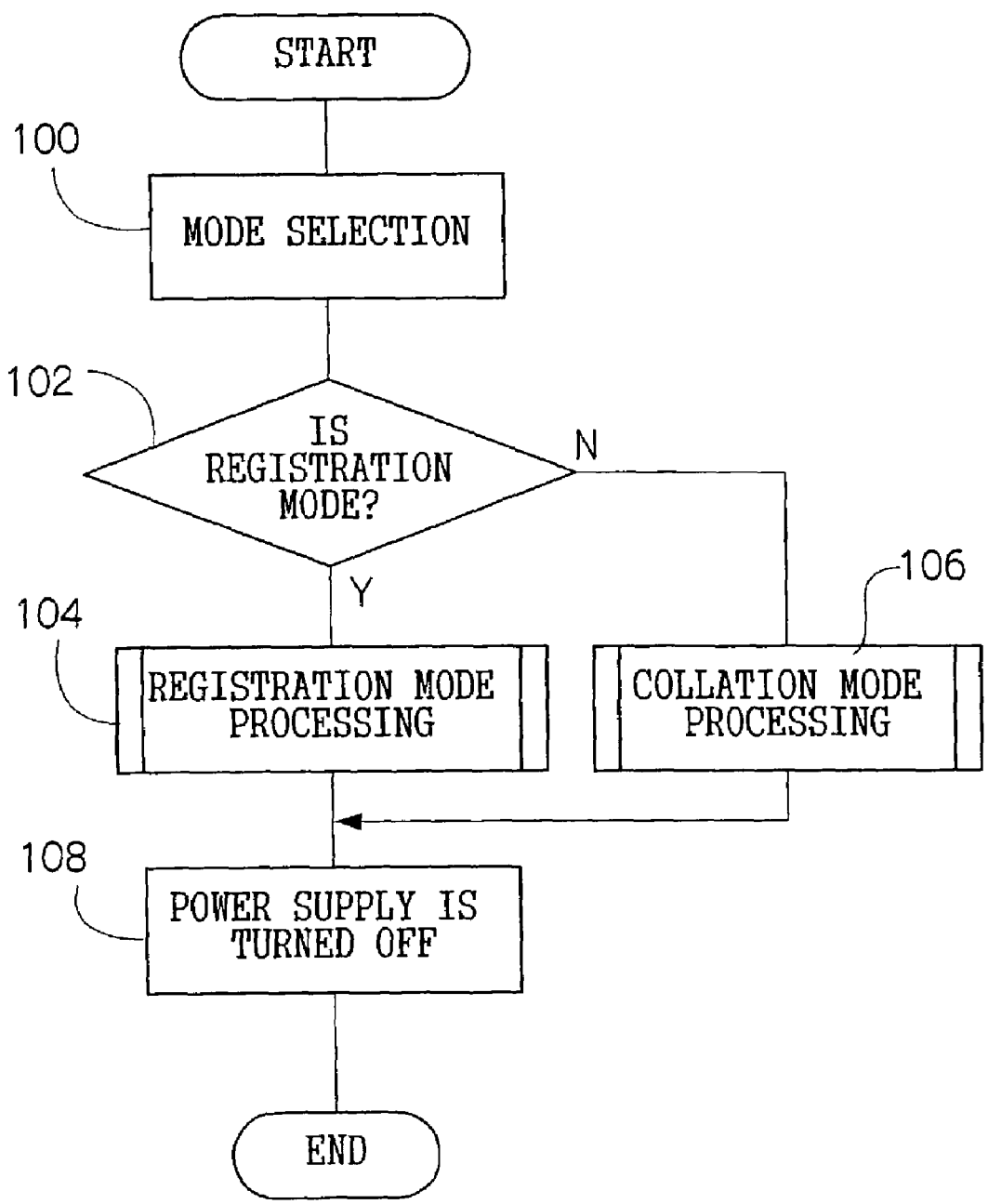
FIG. 7 is a flow chart showing the processing routine of a mode setting processing program according to the first embodiment.

FIG. 7 is a flow chart showing a processing routine which is executed by the CPU 60 in the digital camera 10 when a user turns on a power supply switch (not shown) of the digital camera 10 to operate a mode selection switch (not shown). The routine program is stored in the program area 84 (refer to FIG. 2) of the flash ROM 76 beforehand.

After completion of mode selection with the mode selection switch at STEP 100, it is determined at STEP 102 whether the registration mode has been set or not. Then, in the case of YES at STEP 102 after-described registration mode processing (refer to FIG. 8) is executed at STEP 104.

On the other hand, in the case of NO at STEP 102 after-described collation mode processing (refer to FIG. 10) is executed at STEP 106. When the mode processing at the above step 104 or 106 is completed and the power supply switch of the digital camera 10 is turned off at STEP 108, the mode setting processing is completed.

The embodiment has, as one example, a configuration in which image data may be recorded in the flash ROM 76 only after completion of the registration mode processing. However, the embodiment may have another configuration in which the image data may be recorded in the flash ROM 76 before the collation mode processing is started, even in a case in which the registration mode processing has not been completed.

Figure 4:
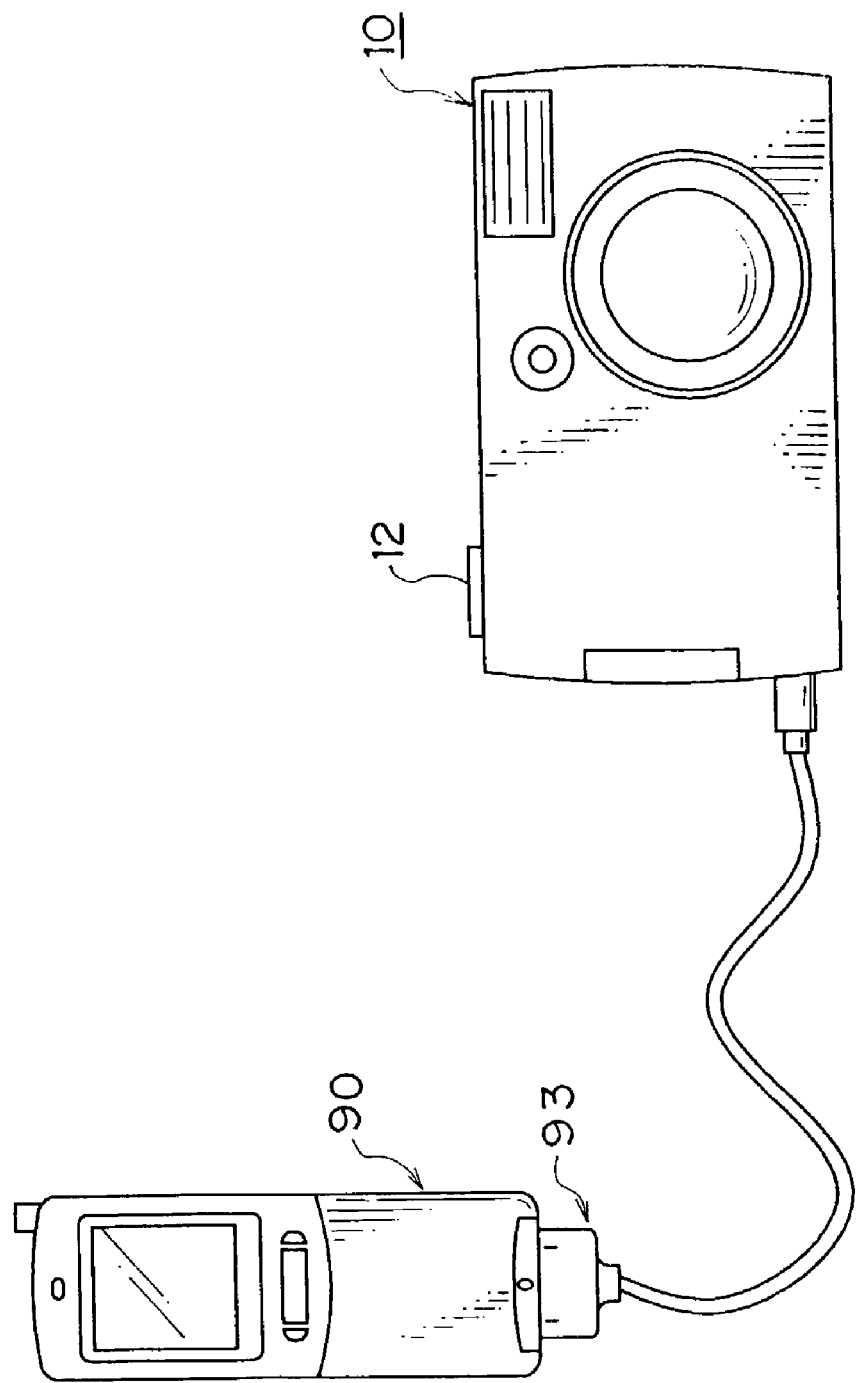
FIG. 4 is a view showing a state in which another mobile telephone is connected to the digital camera.
Figure 8:
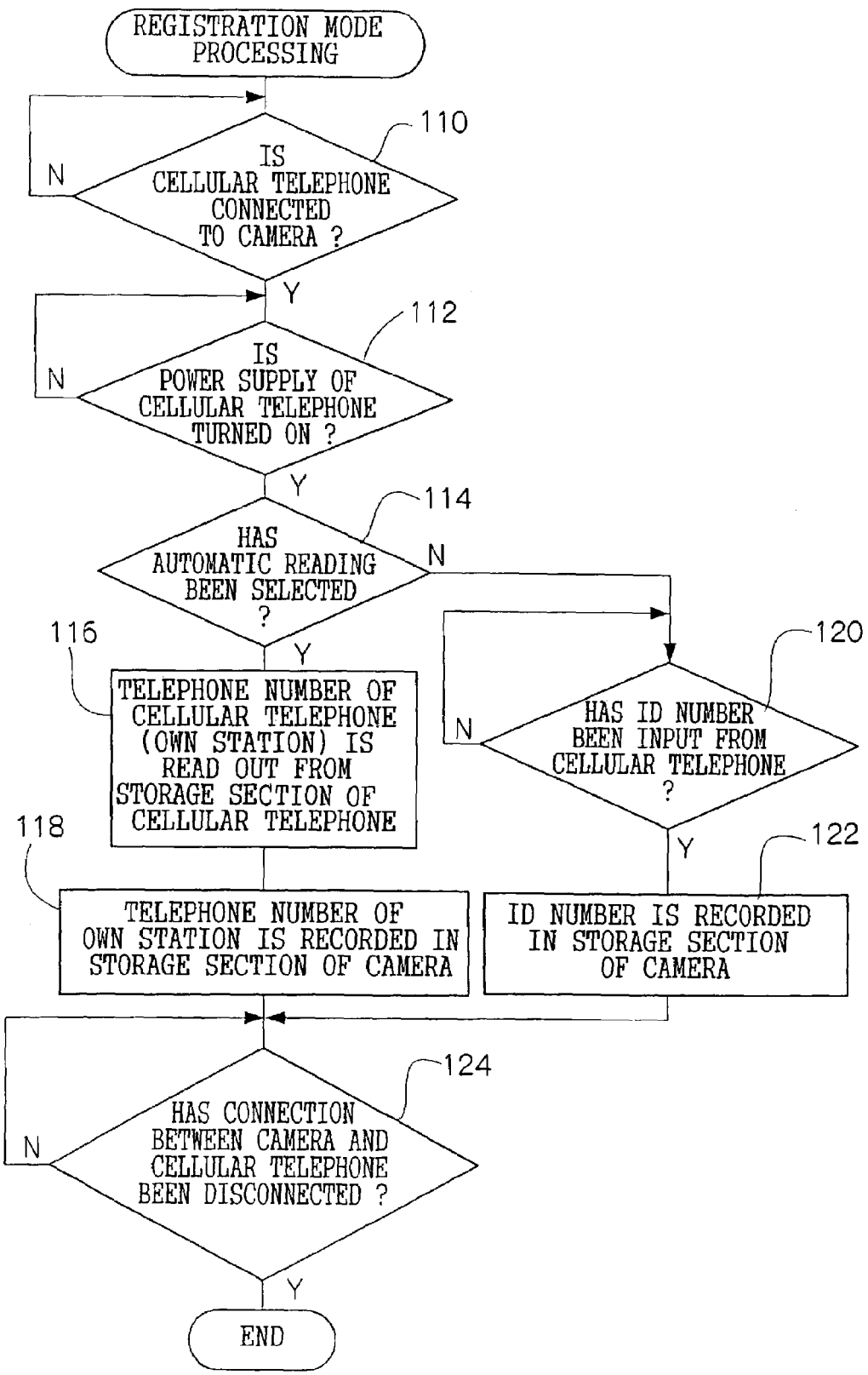
FIG. 8 is a flow chart of the processing routine of the registration mode processing shown in FIG. 7.

Then, details of the registration mode processing (STEP 104) shown in FIG. 7 will be explained, referring to FIG. 8. At STEP 110 shown in FIG. 8, it is determined whether the mobile telephone 90 (refer to FIG. 3 or FIG. 4) is connected to the digital camera 10 or not. In order to connect the mobile telephone 90 to the digital camera 10, a connecting adapter 92 or a cable 93 shown in FIG. 3 or FIG. 4 is used.

Here, based on whether a not-shown connecting section of the digital camera 10 is turned on or off, it is determined whether the mobile telephone 90 is connected to the digital camera 10 or not. Then, the processing at STEP 110 is continued until the mobile telephone 90 is connected to the digital camera 10.

In the case of YES at STEP 110, that is, when the mobile telephone 90 is connected to the digital camera 10, it is determined at STEP 112 whether the power supply of the mobile telephone 90 is turned on or not. The processing at STEP 112 is continued until the power supply of the mobile telephone 90 is turned on.

In the case of YES at STEP 112, that is, when the power supply of the mobile telephone 90 is turned on, it is determined at STEP 114 whether automatic reading in which reading processing of a piece of specific registration identification data is automatically performed is selected or not. The selection of the automatic reading is performed by operation of a selection key of the operation section 73 (refer to FIG. 1).

In the case of YES at STEP 114, that is, when the automatic reading is selected, a telephone number of the mobile telephone 90 (user's number) (for example, "090-1234-5678") is read out from the memory of the mobile telephone 90 at STEP 116, and the read telephone number of the user is recorded at STEP 118 as a piece of registration identification data in the flash ROM 76 which is of a storage section.

That is, in the embodiment, the telephone number of the user is recorded as a piece of specific registration number (identification) data in a fetching area 86 which is provided at the top of the image area 82 (refer to FIG. 2) as shown in FIG. 5 or FIG. 6. The specific registration number data recorded in the fetching area 86 are recorded (added), as it is, or after being changed as a piece of "registration number data" in a control area 87 provided at the top of the image area 82 each time a piece of image data obtained by forming images are fetched into the image area 82.

As shown in FIG. 5 or FIG. 6, an area in which one piece of image data is recorded comprises: a control area 87 in which a piece of "registration number data" corresponding to a piece of image data is recorded; a thumbnail area 88 in which a thumbnail image (reduced image) is recorded; and a main image area 89 where an image without reduction processing is recorded.

In the case of NO at STEP 114, that is, when a specific registration identification number is manually input (here, an identification number manually input is referred to as "ID number"), it is determined at STEP 120 whether the ID number is input from the mobile telephone 90 or not. Then, the processing at STEP 120 is continued until the ID number is input.

The input of the ID number is executed by operation of a not-shown operation (number) key of the mobile telephone 90, and the telephone number of the user and the like may be used as the ID number.

In the case of YES at STEP 120, that is, when the ID number is input, the ID number is recorded in the fetching area 86 (refer to FIGS. 5 and 6) of the flash ROM 76 at STEP 122. Here, the specific identification number data recorded in the fetching area 86 of the flash ROM 76 are configured to be read out only with a special purpose terminal which is provided in a shop which receives an order for photographic developing and enlarging (DPE). That is, the specific identification number data may not be read out from the flash ROM 76 with other units except the above special purpose terminal.

Then, after completion of the processing at STEP 118 or 122, it is determined at STEP 124 whether the connection between the digital camera 10 and the mobile telephone 90 is disconnected or not. The processing at STEP 124 is continued until the connection between the digital camera 10 and the mobile telephone 90 is disconnected. Then, the above registration mode processing is finished after completion of the processing at STEP 124.

Figure 9:
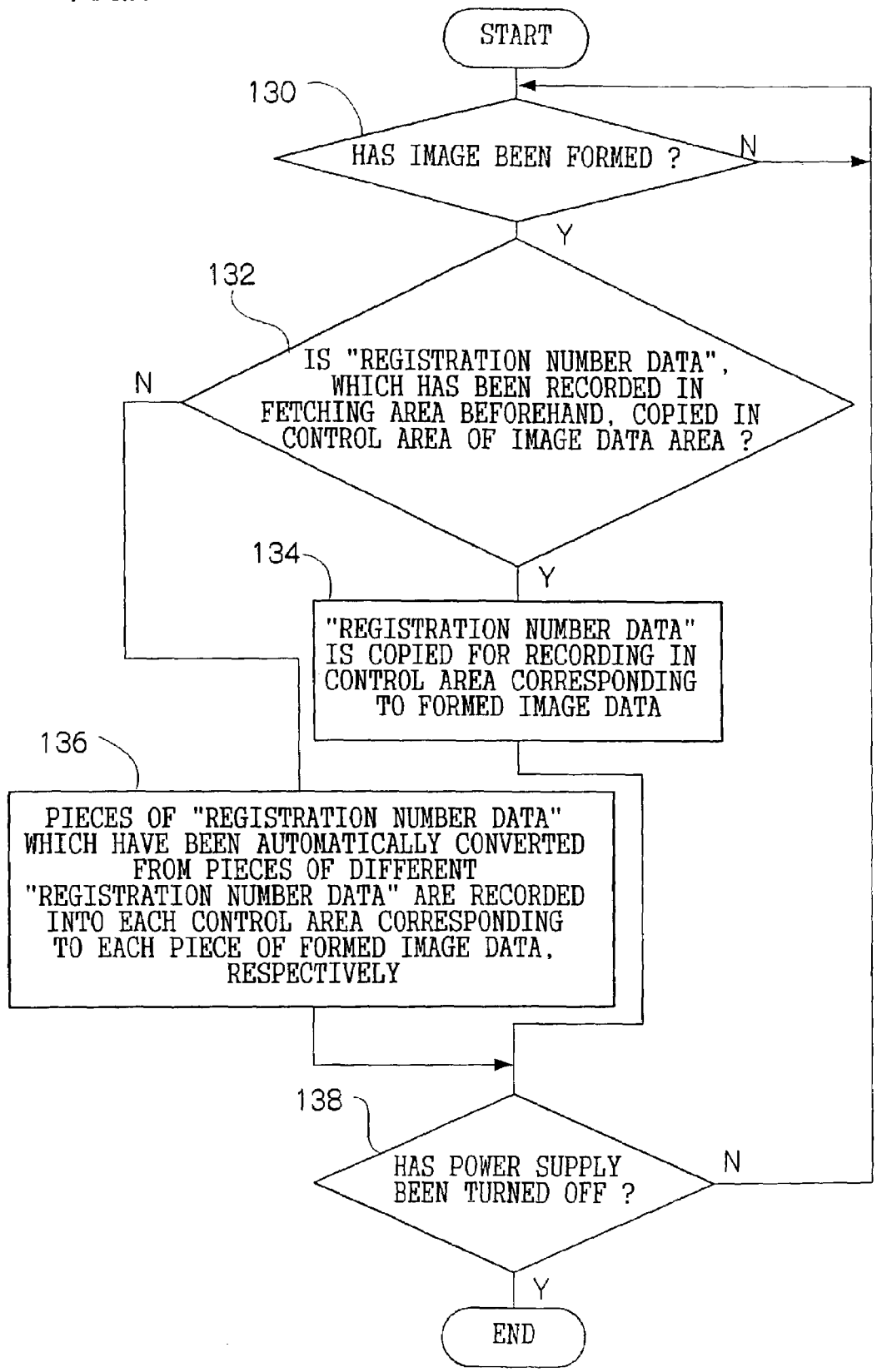
FIG. 9 is a flow chart showing the processing routine for inputting registration number data, which are recorded corresponding to image data, in a control area.

Subsequently, processing by which the image data are simultaneously recorded in the control area 87 (refer to FIGS. 5 and 6) when the image data are recorded in the flush ROM 76 will be explained, referring to FIG. 9. A subroutine shown in FIG. 9 has an assumption that the power supply switch of the digital camera 10 is turned on.

At STEP 130, the shutter button 12 (refer to FIGS. 3 and 4) is pressed, and it is determined whether the imaging processing has been performed or not. In the case of YES at STEP 130, it is determined at STEP 132 whether the specific registration number (the telephone number or ID number of the user) is copied as it is, or not.

That is, it is determined by operating the selection key of the operation section 73 (refer to FIG. 1) whether a piece of "registration number data" to be recorded in the control area 87 (refer to FIGS. 5 and 6) of the flash ROM 76 is the same with the specific registration number, or different from the specific one. Here, the embodiment may have a configuration in which encryption processing is performed in the mobile telephone 90 when the specific registration number (the telephone number or ID number of the user) is read from the memory of the mobile telephone 90. Also, the processing at STEP 130 is continued until the shutter button 12 is pressed.

Then, in the case of YES at STEP 132, that is, when the specific registration number is copied as it is, a piece of "registration number data", which is recorded in the fetching area 86 of the flash ROM 76 beforehand, is copied and recorded at STEP 134 as it is in the control area 87 (refer to FIGS. 5 and 6), corresponding to the formed image data, of the flash ROM 76. That is, the "registration number data" of the control area 87 has the same number with that of the "registration number data" recorded in the fetching area 86, as shown in FIG. 5.

In the case of NO at STEP 132, that is, when the "registration number data" are automatically converted, different "registration number data", to which the "registration number data" has been automatically converted, are recorded at STEP 136 in each control area 87 corresponding to the formed image data, respectively.

A number which is automatically converted, that is, a registration number to be recorded for Σth image data is decided by the following expression.

$$\Sigma = 36\,\Omega + \lambda \quad \text{[Formula 1]}$$

In Formula 1, "Ω" specifies a digit of the registration number to be processed, and "λ" specifies a symbol (a numerical value, as well as the alphabet, is included) which is substituted for the specified digit. The value of "Ω" is obtained by substituting a value corresponding to the digit to be specified in Table 1. Also, a symbol corresponding to a "value of λ" in Table 2 is substituted for the "λ".

TABLE 1

| Value of Ω | 0 | 1 | 2 | 3 | 4 | 5 | 6 | 7 | 8 | 9 | 10 |
|---|---|---|---|---|---|---|---|---|---|---|---|
| Digit to be specified | 1 | 2 | 3 | 4 | 5 | 6 | 7 | 8 | 9 | 10 | 11 |

TABLE 2

| Value of λ | Symbol to be substituted |
|---|---|
| 1 ≦ α ≦ 10 | α − 1 |
| 11 | a |
| 12 | b |
| 13 | c |
| 14 | d |
| 15 | e |
| 16 | f |
| 17 | g |
| 18 | h |
| 19 | i |
| 20 | j |
| 21 | k |
| 22 | l |
| 23 | m |
| 24 | n |
| 25 | o |
| 26 | p |
| 27 | q |
| 28 | r |
| 29 | s |
| 30 | t |
| 31 | u |
| 32 | v |
| 33 | w |
| 34 | x |
| 35 | y |
| 36 | z |

That is, as shown in Table 1, the value of "Ω" is counted from "0". On the other hand, the digit of the registration number to be processed (hereinafter simply referred to as "processed digit") is started from "1". Therefore, the value of "1" is obtained by subtracting (minus) 1 from the numerical value of the processed digit. For example, when the number of the processed digit is "0", the value of "Ω" becomes "1", and, when the number of the processed digit is "1", the value of "Ω" becomes "2". Also, when the number of the processed digit is "11", the value of "Ω" becomes "10".

Here, the digits of the registration number data are counted from the bottom level. That is, when the registration number data is "090-1234-5678", the first digit from the bottom level is "8", the second digit from the level is "7", the ninth digit from the level is "0", the tenth digit from the level is "9", and the 11th digit from the level is "0".

As shown in Table 2, when the value of "λ" is in a range of from "1" through "10", the value "1" is subtracted from a variable "α" of the numerical value in the range of "1" through "10". For example, when the variable "α" is "1", the numerical value of the "λ" which is substituted for the specified digit becomes "0"; when the variable "α" is "2", the numerical value of the "λ" becomes "1"; and, when the variable "α" is "10", the numerical value of the "λ" becomes "9".

Also, assuming that the value of "λ" is in the range of "11" to "36", the symbol of the "λ" which is substituted for the specified digit becomes "a" when the value of "λ" is "11"; the symbol of the "λ", which is substituted for the specified digit becomes "m" when the value of "λ" is "23"; and the symbol of the "λ" becomes "z" when the value of "λ" is "36".

Here, the constant "36" in Formula 1 indicates a number of frames included in one file (that is, the number of "value of λ" in one cycle as shown in Table 2), and the value of the constant can be arbitrarily changed. Moreover, Formula 1 is stored in the program area 84 (refer to FIG. 2) of the flash ROM 76 beforehand.

Then, when "registration number data" which are individually different from each other are recorded (step 136 in FIG. 9), operation processing is executed by using programs stored in the program area 84, based on the values of "Ω" and the values or symbols of "λ", which have been obtained from Table 1 and Table 2 in the table area 80.

For example, when the image data of the first image are recorded in the image area 82 (refer to FIG. 2), the above operation processing is executed for the "registration number data (090-1234-5678)" which is recorded in the fetching area 86 as shown in FIG. 6. That is, the "registration number data" to be recorded in the control area 87 for the image data of the first image becomes "090-1234-5670".

Moreover, the "registration number data" to be recorded in the control area 87 for the image data of the second image becomes "090-1234-5671", the "registration number data" to be recorded in the control area 87 for the image data of the third image becomes "090-1234-5672", and the "registration number data" to be recorded in the control area 87 for the image data of the 85th image becomes "090-1234-5C78". Also, the "registration number data" to be recorded in the control area 87 for the image data of the 300th image becomes "09b-1234-5678" though not shown.

After completion of the processing at STEP 134 or 136 it is determined at STEP 138 whether the power supply of the mobile telephone 90 is turned off or not. Then, the processing at STEP 138 is continued until the power supply of the mobile telephone 90 is turned off. That is, writing processing in the control area 87 corresponding to a piece of image data is executed each time the shutter button 12 is pressed and the image data is recorded in the image area 82.

The writing processing in the control area 87 corresponding to the above image data is finished after completion of the processing at STEP 138. Here, the embodiment may have a configuration in which it is possible to select whether the specific registration number is recorded in the control area 87 or not. Then, when the specific registration number is not recorded in the control area 87, the image data is output without input of the after-described collation number data.

Also, the embodiment may have a configuration in which the fetching area 86 provided in the top of the image area 82 (refer to FIGS. 5 and 6) is used as one control area without independently installing the control areas 87 for each image data. In such a case, all recorded image data may be configured to be output by using the specific registration numbers which are recorded in one control area.

The collation mode processing (STEP 106) shown in FIG. 7 will be explained, referring to FIG. 10. The collation processing is executed for the digital camera 10 for which the registration mode processing shown in FIG. 8 has been already finished. The subroutine in FIG. 10 has an assumption that the above digital camera 10 is carried into a shop which receives an order for photographic developing and enlarging (DPE), and the "registration number (090-1234-5678)" is notified to a clerk in the shop.

Figure 10:
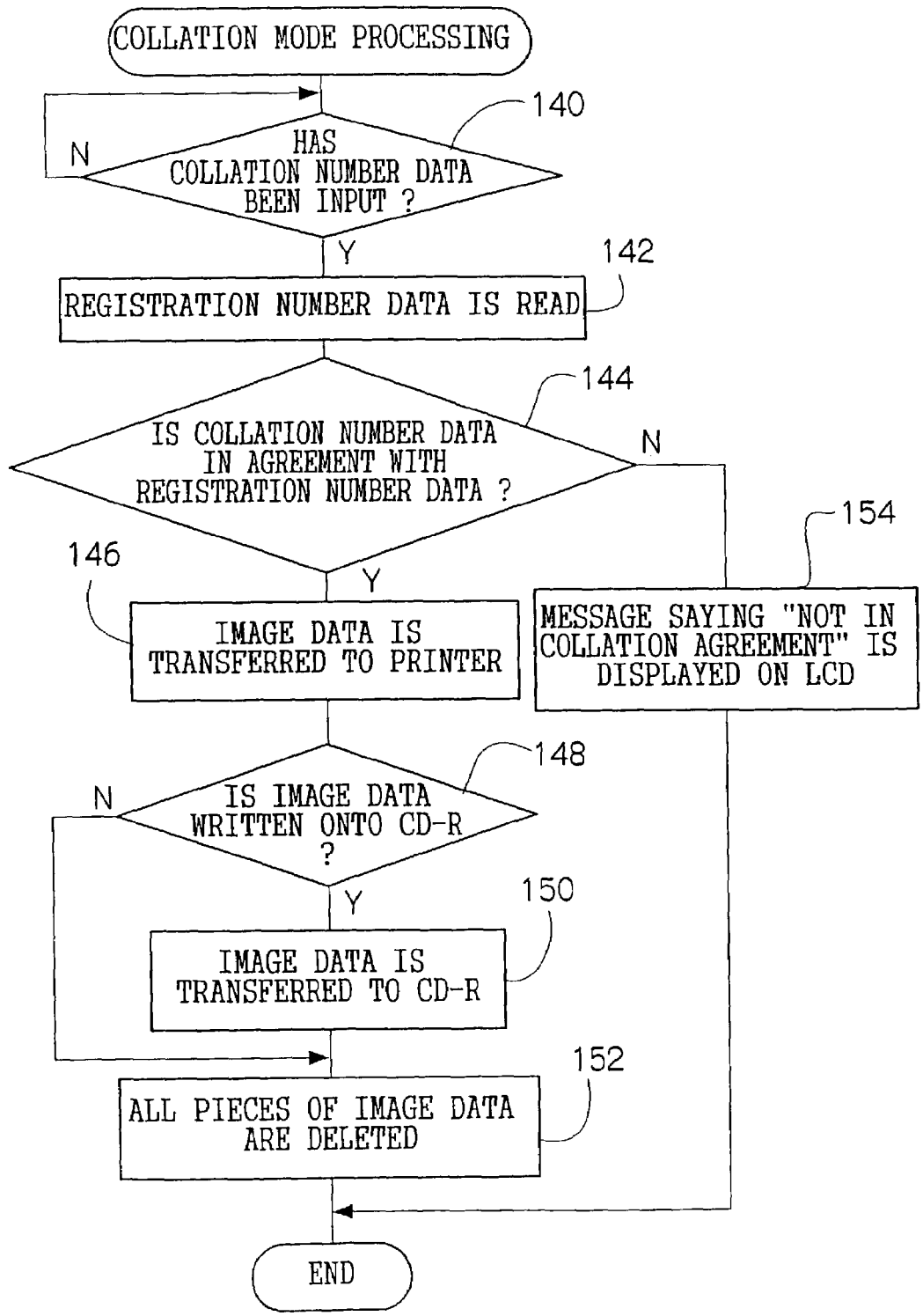
FIG. 10 is a flow chart of the processing routine of collation mode processing shown in FIG. 7.

Here, when the subroutine in FIG. 10 is executed, an input terminal to input collation identification data is connected to the interface 62 (refer to FIG. 1) of the above digital camera 10. Also, the input terminal may be configured to be for example, the user's mobile telephone 90 and the like, which have processed the registration mode. Furthermore, the above collation identification data may be configured to be input through radio communication. And, when the input terminal is assumed to be the mobile telephone, the telephone number may be configured to be input by automatic reading like the processing at STEPs 114 and 116 (refer to FIG. 8).

Moreover, when "registration number data", which are individually different from each other, are under recording processing (refer to STEP 136 in FIG. 9) corresponding to image data, respectively, the registration number data (090-1234-5C78 and the like) which is recorded in the control area 87 of the corresponding image data is input.

In order to execute the above input, for example, a user notifies a "registration number", which has been originally recorded in the fetching area 86 (refer to FIGS. 5 and 6), and the serial number of the image data to the clerk at DPE. That is, "registration number data" which are individually different from each other are derived, using an input terminal in which Formula 1 is stored.

As shown in FIG. 10, it is determined at STEP 140 whether a piece of collation number data is input or not. The processing at STEP 140 is continued until the collation number data is input. Then, in the case of YES at STEP 140, that is, when it is determined that the collation number data has been input, the "registration number data (090-1234-5678)" is read out from the control area 87 (refer to FIG. 5 or FIG. 6) in the image area 82 (refer to FIG. 2) at STEP 142.

After completion of the processing at STEP 142, it is determined at STEP 144 whether the collation number data is in agreement with the registration number data. In the case of YES at STEP 144, that is, when the collation number data and the registration number data are in agreement with each other, the image data read out from the main image area 89 (refer to FIG. 5 or FIG. 6) in the image area 82 is transferred to the printer at STEP 146.

After completion of the processing at STEP 146, it is determined at STEP 148 whether the image data recorded in the image area 82 (refer to FIG. 2) of the flash ROM 76 shown in FIG. 1 is written into CD-R66 or not. That is, it is determined at STEP 148 whether an output key arranged in the operation section 73 (refer to FIG. 1) of the digital camera 10 has been operated or not.

In the case of YES at STEP 148, that is, when the image data in the image area 82 is written into CD-R66, the image data in the image area 82 is transferred to CD-R66 at STEP 150. Here, as the digital camera 10 according to the embodiment is of a single-use type as described above, the processing at STEP 148 is executed so that a firm recovers the digital camera 10 after print out.

That is, as the embodiment has a configuration in which the flash ROM 76 is not detachable from the main body of the digital camera 10, the image data and the registration number data which is recorded in relation with the image data may be output to the outside only when the collation number data and the registration number data are in agreement with each other at DPE. Here, in the processing at STEP 150, a not-shown CD-R device is required to be connected to the interface 64 of the digital camera 10 (refer to FIG. 1).

After execution of the processing at STEP 150, and in the case of NO at STEP 148, that is, when the image data in the image area 82 is not written into CD-R66, all the image data in the image area 82 are deleted at STEP 152. Here, the processing at STEP 152 is executed to reuse the digital camera 10 after the processing, as the camera 10 according to the embodiment is of a single-use type as described above.

In the case of NO at STEP 144, that is, when the collation number data and the registration number data are not in agreement with each other, a message "not in collation agreement" is displayed on the LCD 72 without transferring the image data to the printer at STEP 154. Then, after executing the processing at STEP 152 or 154, the above collation mode processing is finished.

Figure 11:
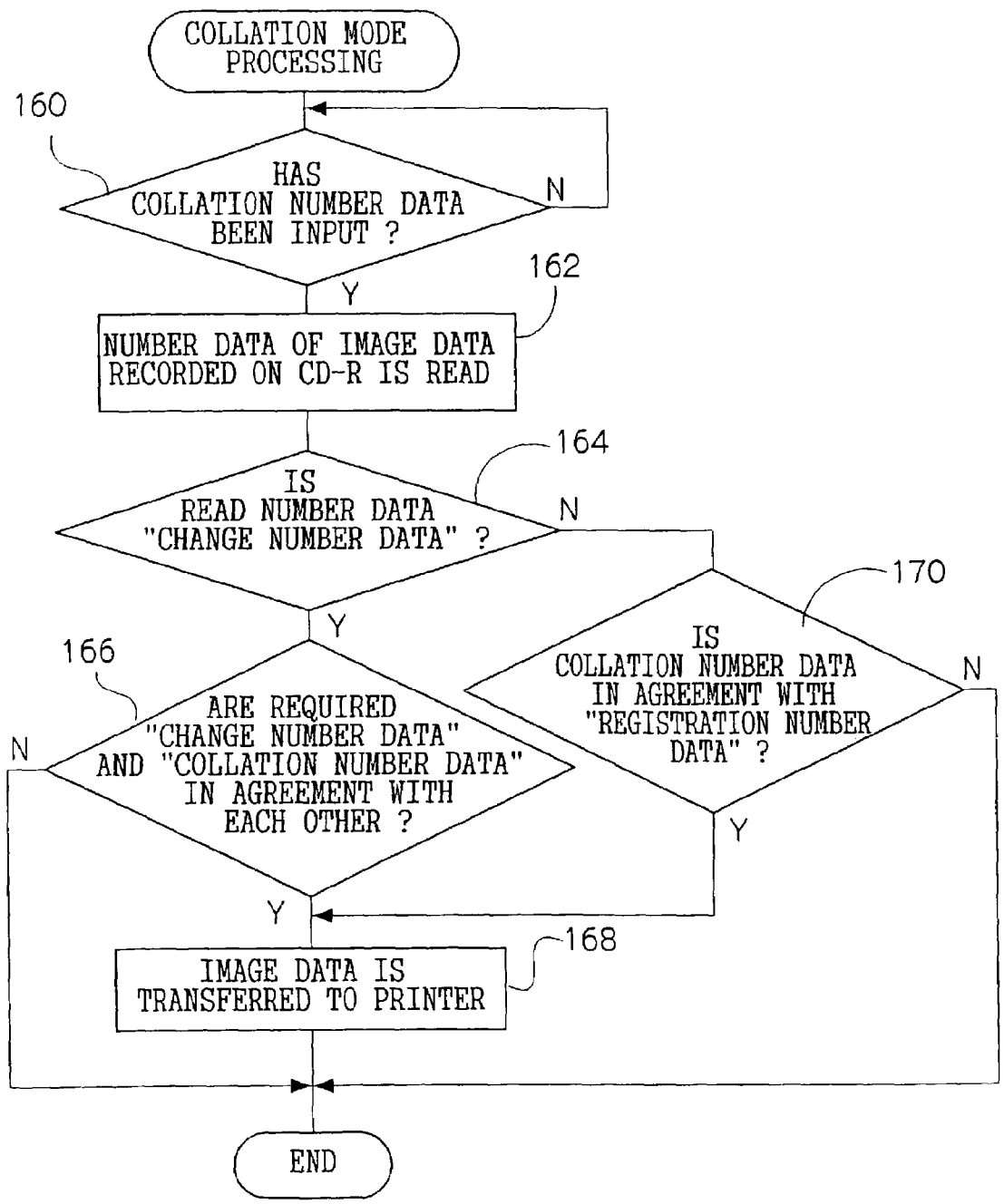
FIG. 11 is a flow chart showing the processing routine for collation by which image data recorded in CD-R for which writing processing has been completed are output.

The image data recorded in CD-R66 for which the writing processing (refer to STEP 150 in FIG. 10) has been executed is output by collation processing which will be explained, referring to FIG. 11. That is, the subroutine in FIG. 11 is for processing by which extra prints are made. Here, the subroutine in FIG. 11 has an assumption that CD-R66 for which the above writing processing has been executed is carried into DPE and the "registration number (09b-1234-5678 and the like)" is notified to the clerk.

When the subroutine in FIG. 11 is executed, the CD-R device and the like, which are provided with an input terminal or an input unit to input the collation identification data, are connected to the printer. Here, in the case of registration number data which are individually different from each other (hereinafter referred to as "change number data"), for example, the above change registration numbers described in a printed index sheet are notified to a clerk in a shop for the routine.

As shown in FIG. 11, it is determined at STEP 160 whether the collation number data has been input or not. The processing at STEP 160 is continued until the collation number data is input. Then, in the case of YES at STEP 160, that is, when it is determined that the collation number data has been input, the number data is read out at STEP 162 from the control area 87 (refer to FIG. 5 or FIG. 6) of the image data, which has been recorded in CD-R66.

After executing the processing at STEP 162, it is determined at STEP 164 whether the read number-data is the "change number data" or not. In the case of YES at STEP 164, that is, when the read number-data is the "change number data", it is determined at STEP 166 whether a piece of desired "change number data" and the collation number data are in agreement with each other, or not. In the case of YES at STEP 166, that is, when both data are in agreement with each other, the desired image data is read from the main image area 89 (refer to FIG. 5 or FIG. 6) recorded in CD-R66 and the desired image data is transferred to the printer at STEP 168.

Also, in the case of NO at STEP 164, that is, when the read number data is the "registration number data", it is determined at STEP 170 whether the "registration number data" and the collation number data are in agreement with each other, or not. In the case of YES at STEP 170, that is, when both data are in agreement with each other, the above processing at STEP 168 is executed.

In the case of NO at STEP 166 or 170, that is, when both of the data are not in agreement with each other, the above collation mode processing is finished at STEP 154 without transferring the image data to the printer. Here, when the result of the above collation is "not in agreement", a message "not in collation agreement" may be displayed on the display section such as the printer. Moreover, after completion of the above collation mode processing, DPE returns CD-R66 to the user.

In the embodiment, the security of the image data may be secured without the complex encryption processing necessary in conventional examples, as the specific registration number data which is added in relation with the image data is the telephone number of the user and the like, which are input from the mobile telephone 90. That is, according to the embodiment, a sense of security may be obtained with less opportunity to forget the specific registration number data when the telephone number of the user input from the mobile telephone 90 is used as the specific registration number data.

Accordingly, according to the embodiment, the collation procedure becomes easier when the image data is obtained or an order for photo prints is made, and access to the image data may be easily restricted, as the security of the image data can be secured without the complex encryption processing necessary in conventional examples.

Moreover, the digital camera 10 according to the embodiment is suitable for a single-use type digital camera which is rented to a general user and recovered from the user, as the flash ROM 76 is built in the main body of the device in a not-detachable manner in the embodiment. Here, the flash ROM 76 has been made non-detachable in order to prevent the specific registration number data, the image data, and the like from being leaked to other computers.

Also, telephone numbers and the like of mobile telephones of a plurality of people may be configured to be recorded in the fetching area 86 of the flash ROM 76 in the above embodiment. That is, when a plurality of people use one digital camera 10 for forming images, a telephone number of a mobile telephone of each of people is configured to be input (for example, the mobile telephone is connected to the digital camera 10) and to be recorded in the control area 87 for image data which each of the people has formed. In this case, it may be specified by collating the registration number data recorded in the control area 87, which has formed the image data.

For example, when mobile telephones with different telephone numbers (the mobile telephones having telephone numbers "090-1234-5678" and "090-4321-8765", respectively) are connected to one digital camera 10, the telephone number data of the mobile telephones (old specific registration identification data), which have been recorded in the fetching area 86 (refer to FIG. 12), are newly rewritten into the telephone number data (new specific registration identification data) of a mobile telephone under current connection, respectively, every time the mobile telephones are connected to the digital camera 10, respectively.

In addition, the embodiment may have, for example, a system with a configuration in which a telephone number of a mobile telephone (collation identification data) which has been received through radio communication is input through a telephone device of DPE to a personal computer which is connected to the above telephone device. That is, when the user makes an order for photo prints, the user is required to make a call from the mobile telephone of the user to the telephone device which has a specified dialing number of DPE.

Figure 12B:
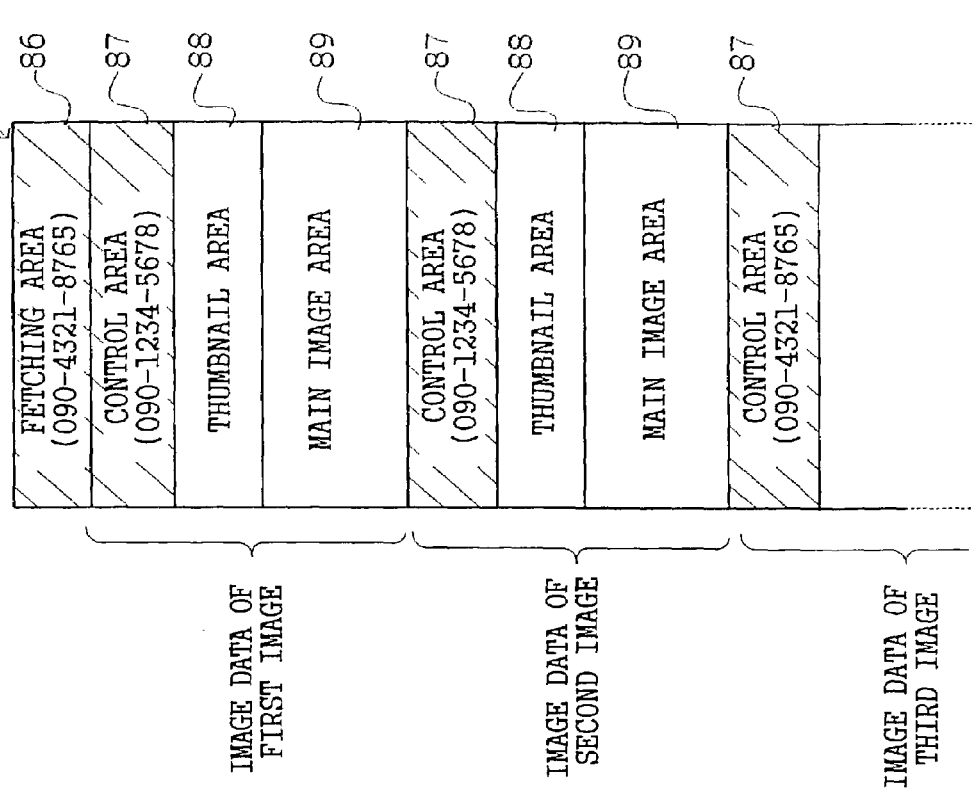
FIGS. 12A and 12B are a diagram for explaining the fetching processing in the memory map shown in FIG. 5.

Hereinafter examples of the above system will be explained, referring to FIGS. 12 through 15. As shown in FIG. 13, in the above registration mode processing, it is determined at STEP 172 whether the mobile telephone 90 is connected to the digital camera 10 or not. Here, the processing at STEP 172 is continued until the mobile telephone 90 is connected to the digital camera 10.

In the case of YES at STEP 172, that is, when the mobile telephone 90 is connected to the digital camera 10, it is determined at STEP 174 whether the power supply of the mobile telephone 90 is turned on or not. Here, the processing at STEP 174 is continued until the mobile telephone 90 is turned on.

In the case of YES at STEP 174, that is, when the power supply of the mobile telephone 90 is turned on, the telephone number of the mobile telephone 90 (for example, "090-1234-5678") is automatically read out from the memory of the mobile telephone 90 at STEP 176. In the processing at STEP 178 it is determined whether the telephone number of the mobile telephone 90 has been already recorded or not in the fetching area 86 (refer to FIG. 12) of the flash ROM 76 as the storage section.

Figure 12A:
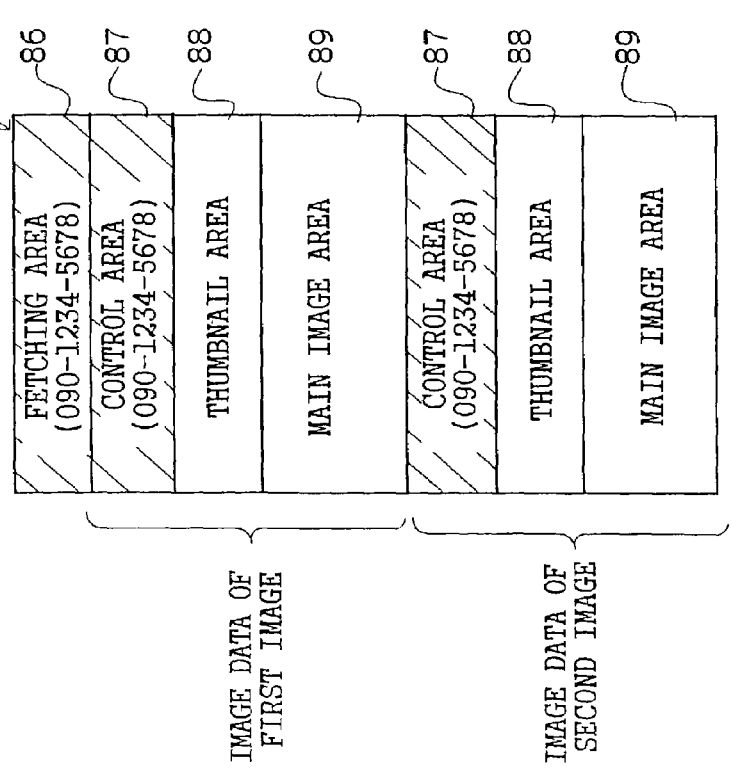
Figure 13:
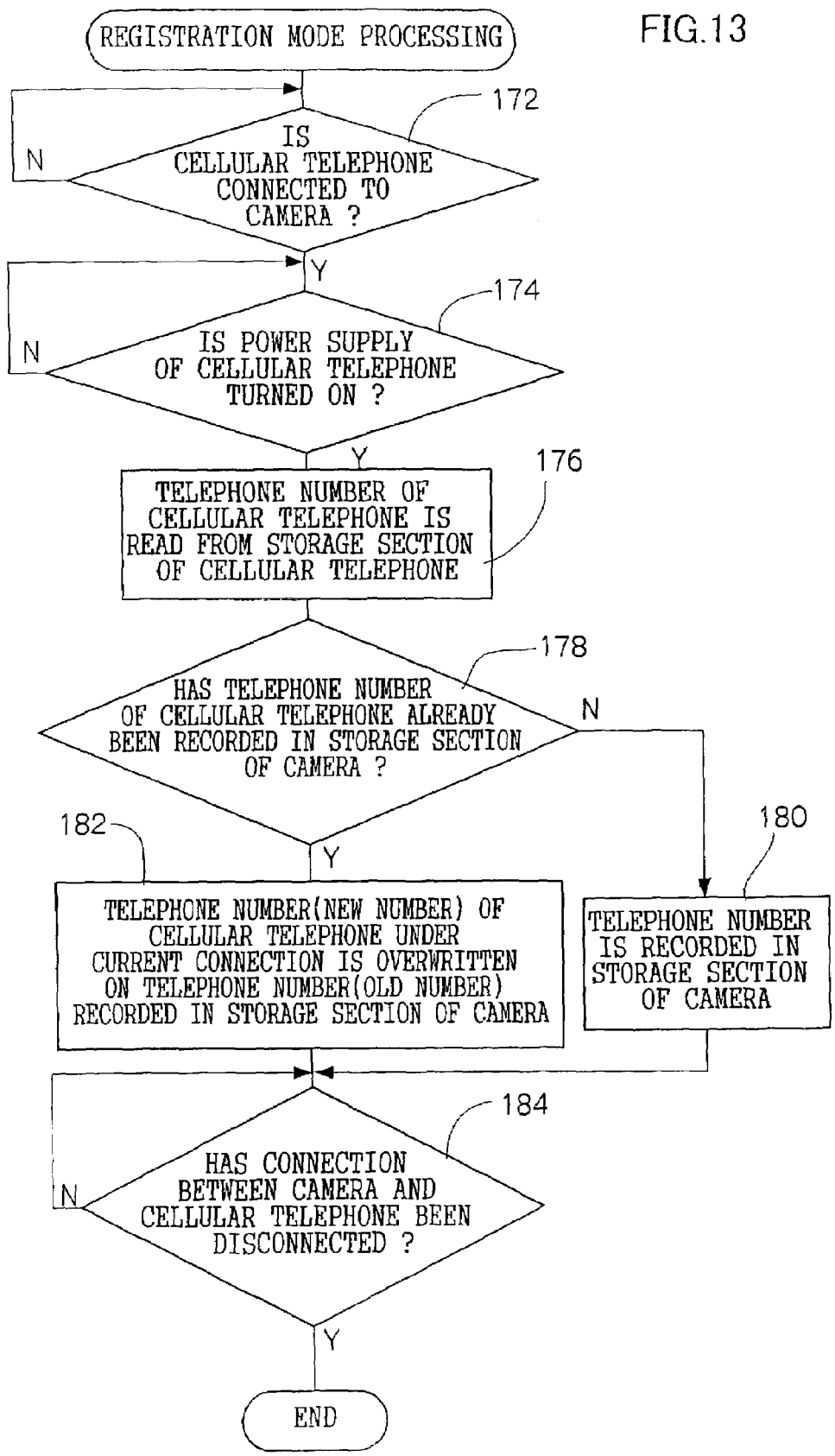
FIG. 13 is a flow chart showing the processing routine of registration mode processing, which is different from that shown in FIG. 8.

In the case of NO at STEP 178, that is, when the telephone number has not been recorded in the fetching area 86 yet, the telephone number ("090-1234-5678" as shown in FIG. 12A) is recorded in the fetching area 86 at STEP 180.

In the case of YES at STEP 178, that is, when the telephone number has been already recorded in the fetching area 86, the telephone number (new telephone number) of the mobile telephone under current connection is overwritten at STEP 182 for recording on the telephone number (old telephone number) recorded in the fetching area 86.

That is, in the case of mobile telephones with the same telephone number, the same telephone number (for example, "090-1234-5678") is overwritten in the fetching area 86 for recording. In the case of mobile telephones which have different telephone numbers from each other, the old telephone number ("090-1234-5678" as shown FIG. 12A) recorded in the fetching area 86 is updated to a new telephone number (for example, "090-4321-8765") as shown in FIG. 12B.

Then, a piece of "specific registration number data (090-1234-5678)", which has been recorded in the fetching area 86 beforehand, is copied as it is and recorded in the control area 87 (refer to FIG. 12A) corresponding to the formed image data when an image is formed with the digital camera 10. That is, the registration number data (090-1234-5678), which have been recorded in the control areas 87 of the image data for the first and the second images, have been the same number with that of a piece of the "specific registration number data" which has been recorded in the fetching area 86 as shown in FIG. 12A.

On the other hand, when a telephone number (090-4321-8765) of a mobile telephone with a different telephone number is overwritten in the fetching area 86 after the image data of the second image is recorded, the registration number data (the telephone number data) recorded in the control areas 87 in the image data of the first and the second images become "090-1234-5678", respectively, and the registration number data to be recorded in the control area 87 of the image data of the third image becomes "090-4321-8765", as shown in FIG. 12B.

Here, in the embodiment, the specific registration identification data recorded in the fetching area 86 may be changed into the latest telephone number data only when the telephone number data at input is different from the telephone number data (the specific registration identification data) recorded in the fetching area 86 of the flash ROM 76.

According to the embodiment, a user who has a mobile telephone corresponding to each formed image data is specified by identifying the identification number data (telephone number data), as the specific registration number data recorded in the fetching area 86 is changed into the latest telephone number data when the telephone number data at input is different from the specific registration identification data recorded in the fetching area 86.

After executing the processing at STEP 180 or 182, it is determined at STEP 184 whether connection between the digital camera 10 and the mobile telephone 90 is disconnected or not. The processing at STEP 184 is continued until the connection between the digital camera 10 and the mobile telephone 90 is disconnected. Then, after completion of processing at STEP 184, the above registration mode processing is finished.

Subsequently, the above collation mode processing will be explained while referring to FIG. 14. By a subroutine in FIG. 14, the digital camera 10 is carried into a shop which receives an order for photographic developing and enlarging (DPE), and a call from the mobile telephone 90 to the telephone device (specified contact address) which has a specified dialing number of DPE is made. A telephone number recorded in the fetching area 86 (refer to FIG. 12) of the digital camera 10 is used as a telephone number of the mobile telephone 90.

Figure 14:
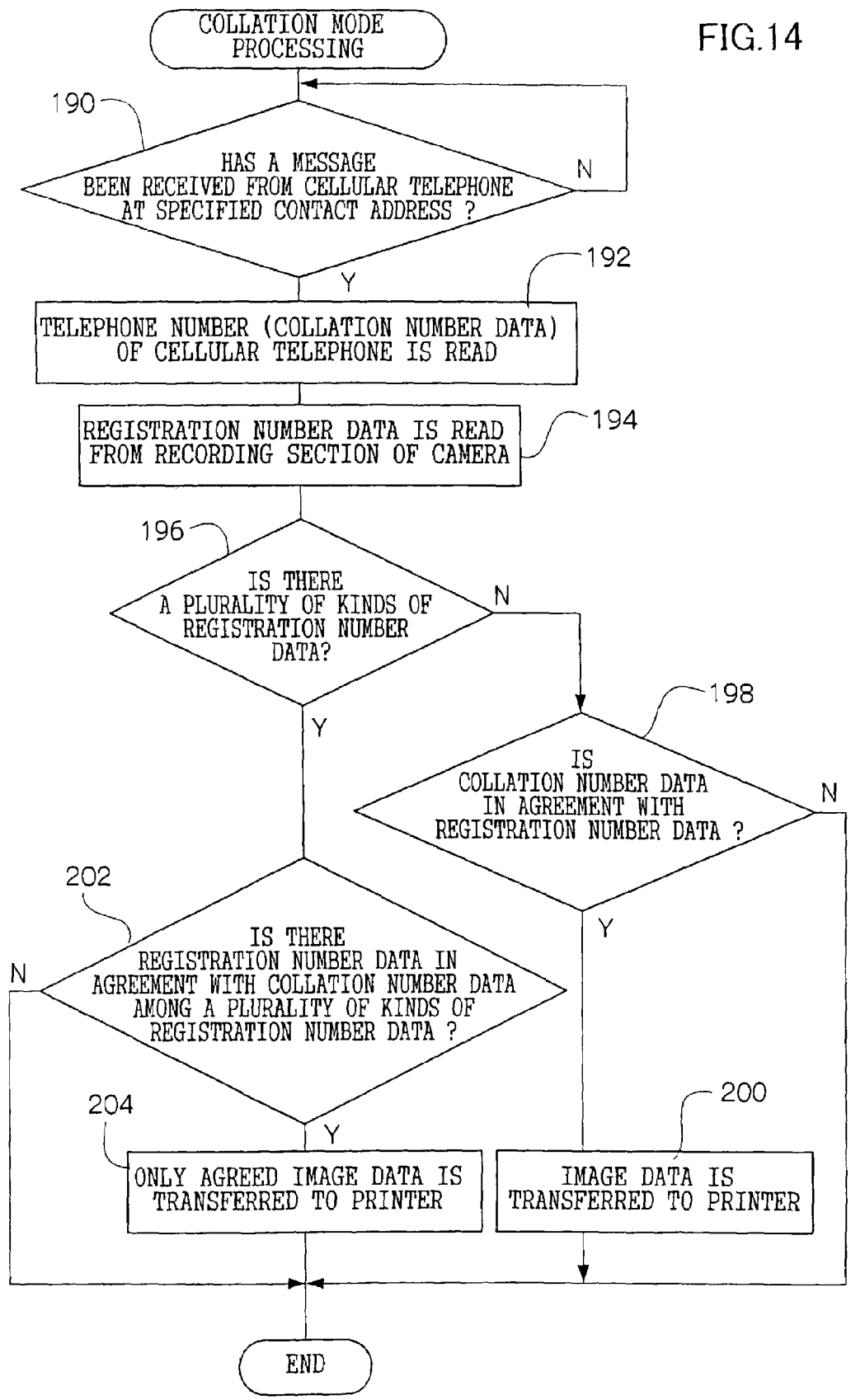
FIG. 14 is a flow chart showing the processing routine of collation mode processing, which is different from that shown in FIG. 10.

Moreover, FIG. 14 shows a flow chart indicating a processing routine for collation mode processing which is executed in a CPU of a data processing device in a state that the digital camera 10 is connected to the data processing device (personal computer) provided in DPE. In addition, the telephone device, which has the specified dialing number of DPE and the printer are connected to the above data processing device, respectively.

It is determined at STEP 190 whether a message from a mobile telephone has been received at the specified contact address or not. The processing at STEP 190 is continued until the message is received from the mobile telephone. Then, in the case of YES at STEP 190, that is, when it is determined that the message has been received from the mobile telephone, a telephone number of the mobile telephone (for example, "090-1234-5678", "090-4321-8765", or the like) is read out at STEP 192 as the collation number data.

A registration number data (for example, 090-1234-5678) is read from the control area 87 (refer to FIG. 12) of the flash ROM 76 (storage section) of the digital camera 10 at STEP 194. It is determined at STEP 196 whether there are a plurality kinds of registration number data ("090-1234-5678", "090-4321-8765", or the like).

In the case of NO at STEP 196, that is, When it is determined that there are no plurality kinds of registration number data (there is only a single piece of registration number data), it is determined at STEP 198 whether the collation number data is in agreement with the registration number data. In the case of YES at STEP 198, that is, when the collation number data and the registration number data are in agreement with each other, the image data read out from the main image area 89 (refer to FIG. 12) of the image area 82 is transferred at STEP 200 to the printer.

In the case of YES at STEP 196, that is, when it is determined that there are a plurality of kinds of registration number data, it is determined at STEP 202 whether there is, among a plurality of kinds of the registration number data, a piece of registration number data in agreement with the collation number data, or not. In the case of YES at STEP 202, that is, when there is a piece of registration number data in agreement with the collation number data, only the image data read out from the main image area 89 corresponding to the registration number data in agreement with the collation number data is transferred at STEP 204 to the printer.

Here, it is required to make calls from a plurality of the mobile telephones to each specified contact address, respectively, and to execute the processing at STEPs 202 and 204 in order to output all image data to the outside of the digital camera 10 when there are a plurality of kinds of registration number data.

In the case of NO at either or both of STEPs 198 and 202, that is, when all parts or a part of the registration number data are not in agreement with the collation number data, the above collation mode processing is finished without transferring the image data not in agreement with the collation number data to the printer. Here, for example, when all the image data are printed out, a firm may recover the digital camera 10.

Moreover, after completion of the processing at STEP 200 or 204, only image data corresponding to the registration number data in agreement with the collation number data, respectively, may be configured to be written into CD-R66 like the processing at STEP 150 shown in FIG. 10, or to be "deleted" like the processing at STEP 152 shown in FIG. 10.

Subsequently, when image data has been written into CD-R66 as processing, the image data recorded in CD-R66 for which the above writing processing has been executed is output by collation processing which will be explained, referring to FIG. 15. That is, FIG. 15 shows a subroutine for processing by which extra prints are made.

Figure 15:
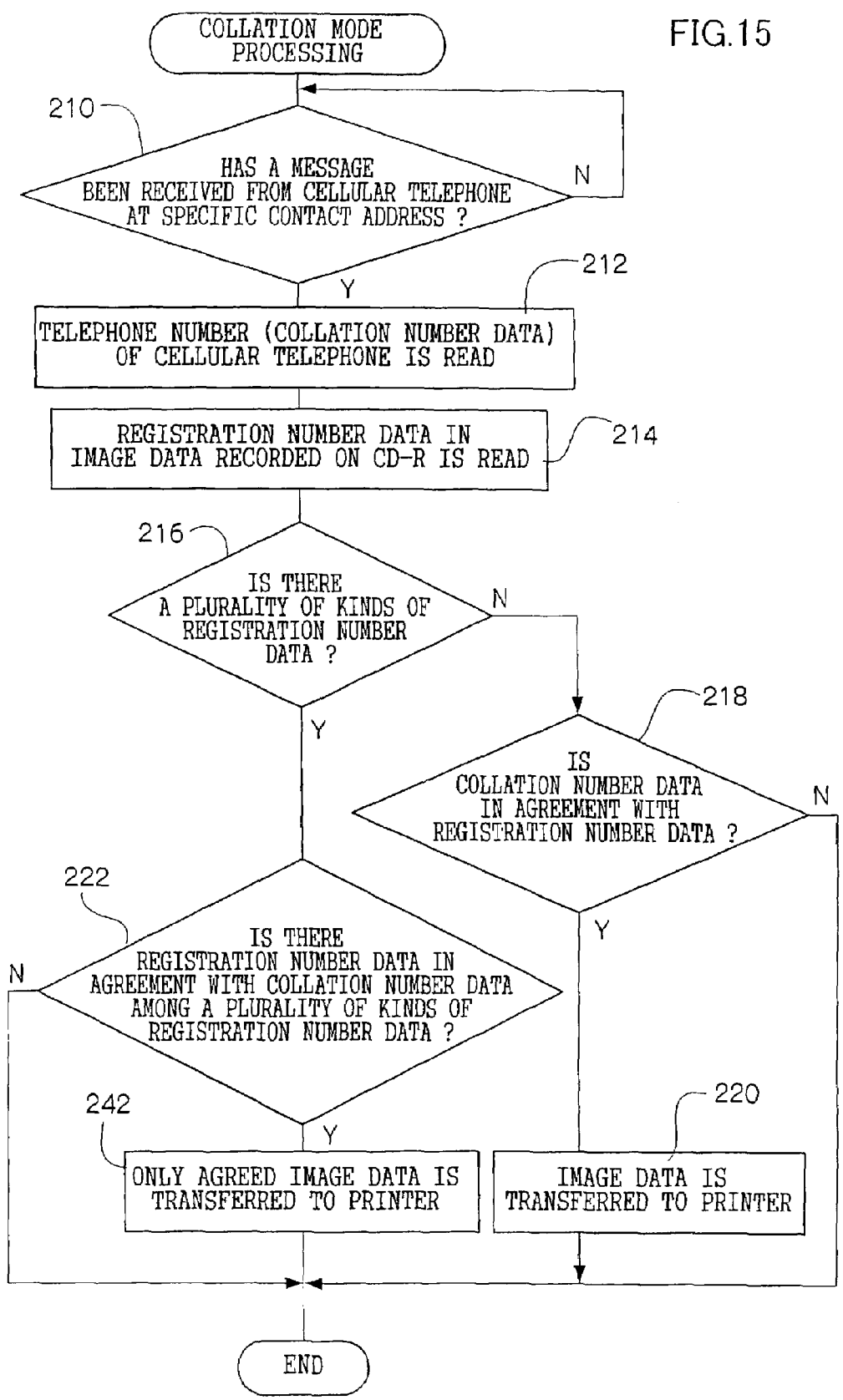
FIG. 15 is a flow chart showing the processing routine of collation mode processing, which is different from that shown in FIG. 11.

In the subroutine in FIG. 15, CD-R66 for which the above writing processing has been executed is carried into DPE, and a call is made from the mobile telephone 10 to the specified contact address. Moreover, a CD-R device, the above telephone device, and the printer are connected to the above data processing device, respectively, in order to execute the subroutine in FIG. 15.

It is determined at STEP 210 whether a message from a mobile telephone has been received at the specified contact address or not. In the case of YES at STEP 210, that is, when it is determined that the message has been received from the mobile telephone, a telephone number of the mobile telephone to become a collation number data is read at STEP 212.

At STEP 214, a piece of registration number data is read out from the control area 87 (refer to FIG. 12) in a piece of image data recorded on CD-R66. It is determined at STEP 216 whether there are a plurality of kinds of the registration number data. In the case of NO at STEP 216, that is, when it is determined that there is a single piece of the registration number data, it is determined at STEP 218 whether the collation number data is in agreement with the registration number data or not. In the case of YES at STEP 218, that is, when the collation number data and the registration number data are in agreement with each other, the image data which is read out from the main image area 89 (refer to FIG. 12) of the image area 82 is transferred to the printer at STEP 220.

In the case of YES at STEP 216, that is, when it is determined that there are a plurality of kinds of registration number data, it is determined at STEP 222 whether there is, among a plurality of kinds of the registration number data, a piece of registration number data in agreement with the collation number data, or not. In the case of YES at STEP 222, that is, when there is a piece of registration number data in agreement with the collation number data, only the image data read out from the main image area 89 corresponding to the registration number data in agreement with the collation number data is transferred to the printer at STEP 242.

Here, when there are a plurality of kinds of registration number data, it is required to make calls from a plurality of the mobile telephones to each specified contact address, respectively, and to execute the processing at STEPs 222 and 242 in order to output all image data to the outside of the digital camera 10. In the case of NO at either or both of STEPs 218 and 222, that is, when all parts or a part of the registration number data are not in agreement with the collation number data, the above collation mode processing is finished without transferring the image data corresponding to the registration number data not in agreement with the collation number data to the printer. Here, after completion of the above collation mode processing DPE returns the user CD-R66.

According to the embodiment, the input of the specific collation identification data (collation number data) is configured to be based on whether a message has been received at the specified contact address of the mobile telephone or not, and the collation number data is configured to be a telephone number data (for example, 090-1234-5678) of the mobile telephone from which the message has been received at the specified contact address. Accordingly, access processing to the image data may become easier in comparison with complex decryption processing, for example, in conventional examples, and the security of the image data can be secured.

Also, when there are a plurality of kinds of collation number data, only image data for which the specific registration identification data (registration number data) and the collation number data are in agreement with each other is configured to be accessible according to the embodiment. Accordingly, the security of each image data can be secured in a smooth and reliable manner.

Moreover, though the recording medium has been configured to be CD-R as one example in the embodiment, the recording medium according to the invention may be, for example, a smart media (R), a compact flash, an ATA card, a floppy disk, CD-RW and the like.

In addition, the invention may have a configuration in which, assuming that the registration number data and the collation number data are in agreement with each other, orders through the Internet and the like can be applied as a method by which the image data or a print on which the image data is printed is obtained.

Though a case, in which the digital camera 10 and other devices are connected to each other through USB and the like, has been explained in the embodiment, the invention is not limited to the above embodiment, and other forms may be adopted, for example, a form in which the connection is made through wire communication (for example, IEEE1394) other than USB, or a case in which the connection is made through radio communication (for example, Bluetooth technology, and IrDA) may be applied.

Furthermore, though a case, in which the collation mode processing shown in FIG. 10 is executed in the digital camera 10, has been explained in the embodiment, the invention is not limited to the above embodiment, and for example, a form, in which the collation mode processing is executed in a device (a personal computer (PC) and the like) to which the digital camera 10 is connected, may be applied.

In addition, it is obvious that the flow charts (refer to FIGS. 7 through 11, and FIGS. 13 through 15) for programs which have been explained in the embodiment have been shown only as one example, and various kinds of modifications and changes may be made without departing from the spirit of the invention.

What is claimed is:

1. An electronic device with an imaging function, comprising:
   an imaging unit, which forms images of objects;
   an input section, which automatically receives registration identification data from a first external terminal, the registration identification data uniquely identifying the first external terminal; and
   a recording unit, which registers the registration identification data received from the first external terminal as specific registration identification data by recording the received registration identification data in a first area,
   wherein, each time image data is formed by the imaging unit, image registration data is recorded in another area with the image data formed by the imaging unit, the image registration data comprising either the currently registered specific registration identification data or a variation of the currently registered specific registration identification data, such that the specific registration identification data registered at the time each image data was formed is determinable from the corresponding image registration data,
   wherein the registration identification data received from the first external terminal is recorded in the first area as the specific registration identification data until a new registration identification data is received from a second external terminal and registered as the specific registration identification data by the recording unit, the new registration identification data uniquely identifying the second external terminal.

2. The electronic device with an imaging function according to claim 1, wherein the first and second external terminals are mobile telephones, and the registration identification data of the first and second mobile telephones being the respective telephone numbers of said mobile telephones.

3. The electronic device with an imaging function according to claim 2, wherein the specific registration identification date recorded in the first area is updated to the latest telephone number data received when the telephone number received by the input section is different from the telephone number previously recorded in first area as the specific registration data.

4. The electronic device with an imaging function according to claim 1, comprising a conversion unit, which converts the specific registration identification data input registered at the time each image data is formed by the imaging unit into a variation of the specific registration identification data that is recorded as the corresponding image registration data of the image data.

5. The electronic device with an imaging function according to claim 1, wherein the recording unit is configured to be contained non-detachably in the electronic device.

6. The electronic device with an imaging function according to claim 1, wherein the electronic device is a digital camera, which is rented to and recovered from said users.

7. The electronic device with an imaging function according to claim 1, wherein the registration identification data input from the first and second external terminals, respectively, are encrypted at the first and second external terminals, which processes encryption.

8. An image data output system, comprising:
   an input unit, which inputs collation identification data;
   a conversion unit, which automatically converts the input collation identification data into a specific collation identification data based on a user designation of one of a plurality of image data files the are recorded in a recording unit in correspondence with the input collation identification data;

a collation unit, which collates the specific collation identification data with specific registration identification data recorded in correspondence with the user designated image data file recorded in the recording unit; and an authorization unit, which authorizes access to the designated image data file recorded in the recording unit only when the collation unit finds that the collated specific registration identification data and specific collation identification data match each other, wherein the conversion unit converts the collation identification data input by the input unit into the specific collation identification data according to a conversion processing, which has been executed on a specific registration identification data recorded in the recording unit to generate different specific registration identification data recorded in the recording unit in correspondence with the plurality of image data files, respectively.

9. The image data output system according to claim 8, wherein the collation identification data input to the input unit are collation identification data that users have specified.

10. The image data output system according to claim 8, wherein the input unit is a mobile telephone through which the specific registration identification data are input.

11. The image data output system according to claim 10, wherein the collation identification data are automatically read from the mobile telephone.

12. The image data output system according to claim 10, wherein the collation identification data input from the input unit is the telephone number of a mobile telephone from which a message has been received.

13. The image data output system according to claim 8, comprising an output unit, which outputs image data file authorized by the authorization unit, to an external destination.

14. The image data output system according to claim 13, wherein the output unit is one of a printer and a recording device using a recording medium.

15. The image data output system according to claim 13, comprising a deletion unit, which deletes the image data recorded in the recording unit, wherein the deletion unit deletes an image data file from the recording unit after the image data file is output to an external destination by the output unit.

16. An image data output method, comprising:

reading out a specific registration identification data from a recording medium, in which a plurality of image data files and specific registration identification data corresponding to the image data files have been recorded;

inputting collation identification data through an input unit;

automatically converting the input collation identification data into a specific collation identification data based on a user designation of one of the plurality of image data files recorded in the recording medium in correspondence with the input collation identification data; and configuring the designated image data file recorded in the recording medium to be output only when the specific collation identification data input through the input unit and the specific registration identification data read from the recording medium match each other, wherein the automatically converting step converts the collation identification data input through the input unit into the specific collation identification data according to a conversion processing, which has been executed on a specific registration identification data to generate different specific registration identification data recorded in the recording medium in correspondence with the plurality image data files respectively.

17. The image data output method according to claim 16, wherein the collation identification data input to the input unit are specified by users.

18. The image data output method according to claim 16, wherein the input unit is configured to be a mobile telephone.

19. The image data output method according to claim 18, wherein the collation identification data are read automatically from the mobile telephone.

20. The image data output method according to claim 18, wherein the collation identification data input from the input unit is the telephone number of a mobile telephone from which a message has been received.

* * * * *